United States Patent
Hasegawa

(10) Patent No.: US 12,413,302 B2
(45) Date of Patent: Sep. 9, 2025

(54) COMMUNICATION APPARATUS, COMMUNICATION CONTROL METHOD, NON-TRANSITORY COMPUTER READABLE MEDIUM, AND OPTICAL COMMUNICATION SYSTEM

(71) Applicant: NEC Corporation, Tokyo (JP)

(72) Inventor: Yohei Hasegawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 240 days.

(21) Appl. No.: 18/273,205

(22) PCT Filed: Jan. 25, 2021

(86) PCT No.: PCT/JP2021/002464
§ 371 (c)(1),
(2) Date: Jul. 19, 2023

(87) PCT Pub. No.: WO2022/157981
PCT Pub. Date: Jul. 28, 2022

(65) Prior Publication Data
US 2024/0088996 A1    Mar. 14, 2024

(51) Int. Cl.
*H04B 10/07* (2013.01)
*H04B 10/077* (2013.01)
*H04B 10/079* (2013.01)

(52) U.S. Cl.
CPC ..... *H04B 10/0775* (2013.01); *H04B 10/0773* (2013.01); *H04B 10/07* (2013.01);
(Continued)

(58) Field of Classification Search
CPC .......... H04B 10/0775; H04B 10/0773; H04B 10/07; H04B 10/0793; H04B 10/0795; H04B 10/07953
(Continued)

(56) References Cited

U.S. PATENT DOCUMENTS 6,167,259 A * 12/2000 Shah ..................... H04B 17/309
370/468
6,347,217 B1 * 2/2002 Bengtsson ............ H04W 24/00
455/226.4
(Continued)

FOREIGN PATENT DOCUMENTS

JP    2005-110211 A    4/2005
JP    2007-318750 A    12/2007
(Continued)

OTHER PUBLICATIONS

International Search Report for PCT Application No. PCT/JP2021/002464, mailed on Apr. 27, 2021.
(Continued)

*Primary Examiner* — Dibson J Sanchez
(74) *Attorney, Agent, or Firm* — Sughrue Mion, PLLC

(57) ABSTRACT

A communication apparatus capable of easily grasping a communication quality status includes: an acquisition unit configured to acquire measured values of a predetermined number or more measured for communication quality information in an optical communication path; an estimation unit configured to calculate an average value of the acquired measured values, generate a first cumulative distribution function of the communication quality information based on the acquired measured values, and estimate a second cumulative distribution function of the communication quality information based on measured values when the measured values more than a number of the acquired measured values are acquired based on the average value and the first cumulative distribution function; and a determination unit configured to determine a value of the communication quality information as a reference quality value, a cumulative probability in the second cumulative distribution func-
(Continued)

tion becoming a predetermined value at the value of the communication quality information.

13 Claims, 11 Drawing Sheets

(52) U.S. Cl.
CPC ...... *H04B 10/0793* (2013.01); *H04B 10/0795* (2013.01); *H04B 10/07953* (2013.01)

(58) Field of Classification Search
USPC ...................................................... 398/9–38
See application file for complete search history.

(56) References Cited

U.S. PATENT DOCUMENTS

| | | | | |
|---|---|---|---|---|
| 6,760,567 B1* | 7/2004 | Jeong | .................. | H04B 17/26 370/335 |
| 2002/0171885 A1* | 11/2002 | Rasztovits-Wiech | ........................ | H04B 10/07953 398/140 |
| 2005/0047347 A1* | 3/2005 | Lee | ........................ | H04L 1/20 370/241 |
| 2006/0200710 A1* | 9/2006 | Webb | ........................ | H04L 1/203 714/704 |
| 2006/0268976 A1* | 11/2006 | Baum | ................. | H04L 27/0008 375/239 |
| 2006/0291869 A1* | 12/2006 | Lindsay | ............ | H04B 10/25137 398/183 |
| 2007/0259671 A1* | 11/2007 | Cheng | ........................ | H04L 1/20 455/452.2 |
| 2007/0270101 A1 | 11/2007 | Mourad | | |
| 2007/0275665 A1* | 11/2007 | Molnar | ................ | H04L 25/0222 455/504 |
| 2007/0280681 A1* | 12/2007 | Frankel | ................ | H04J 14/0287 398/5 |
| 2009/0154388 A1* | 6/2009 | Jalloul | ................... | H04L 1/0003 370/312 |
| 2010/0035654 A1* | 2/2010 | Iwamura | ................ | H04W 68/00 455/561 |
| 2011/0032835 A1* | 2/2011 | Zhu | ........................... | H04L 1/20 370/252 |
| 2011/0310946 A1* | 12/2011 | Sakai | ..................... | H04B 7/063 375/224 |
| 2012/0164955 A1* | 6/2012 | Amirijoo | .......... | H04W 52/0203 455/67.11 |
| 2012/0176886 A1* | 7/2012 | Yu | ........................ | H04L 27/2614 370/210 |
| 2012/0226727 A1 | 9/2012 | Zivny et al. | | |
| 2012/0230671 A1 | 9/2012 | Nakada et al. | | |
| 2012/0275780 A1* | 11/2012 | Hueda | ............... | H04L 25/03292 398/208 |
| 2012/0287813 A1* | 11/2012 | Alm | ....................... | H04L 1/0009 370/252 |
| 2013/0097349 A1* | 4/2013 | Lu | ........................... | G06F 13/36 710/122 |
| 2013/0157680 A1* | 6/2013 | Morita | ................ | H04W 72/541 455/452.2 |
| 2013/0275109 A1* | 10/2013 | Vassilieva | ............ | H04J 14/0227 703/13 |
| 2014/0169295 A1* | 6/2014 | Roh | ........................ | H04L 1/20 370/329 |
| 2014/0364154 A1* | 12/2014 | Sawamoto | ............ | H04W 48/04 455/456.5 |
| 2016/0218761 A1* | 7/2016 | Shahsavari | ............... | H04B 1/16 |
| 2017/0070298 A1* | 3/2017 | Elgala | ................. | H04L 27/2697 |
| 2017/0346559 A1* | 11/2017 | Eroglu | ............. | H04B 10/07953 |
| 2019/0260495 A1* | 8/2019 | Nammi | ................. | H04L 1/0016 |
| 2020/0119836 A1* | 4/2020 | Lyu | ........................ | H04L 1/0025 |
| 2020/0260298 A1* | 8/2020 | Haartsen | ............... | H04W 76/16 |
| 2022/0155538 A1* | 5/2022 | Fini | ...................... | G02B 6/4218 |

FOREIGN PATENT DOCUMENTS

| | | |
|---|---|---|
| JP | 2017-227452 A | 12/2017 |
| JP | 2018-011218 A | 1/2018 |
| WO | 2011/037245 A1 | 3/2011 |

OTHER PUBLICATIONS

JP Office Action for JP Application No. 2022-576943, mailed on Sep. 17, 2024 with English Translation.

* cited by examiner

COMMUNICATION APPARATUS, COMMUNICATION CONTROL METHOD, NON-TRANSITORY COMPUTER READABLE MEDIUM, AND OPTICAL COMMUNICATION SYSTEM

This application is a National Stage Entry of PCT/JP2021/002464 filed on Jan. 25, 2021, the contents of all of which are incorporated herein by reference, in their entirety.

TECHNICAL FIELD

The present disclosure relates to a communication apparatus, a communication control method, a non-transitory computer readable medium, and an optical communication system.

BACKGROUND ART

For example, as disclosed in Patent Literature 1, strong error correction processing is generally executed in an optical communication system that communicates via a submarine cable. Therefore, signal errors are extremely small as compared with land-based communication systems. Thus, optical communication systems are systems capable of providing end user so-called error-free communication in which an error rate of received and transmitted data is extremely low.

CITATION LIST

Patent Literature

Patent Literature 1: International Patent Publication No. WO 2011/037245

SUMMARY OF INVENTION

Technical Problem

By the way, in recent years, communication carriers each of which manages communication infrastructure thereof become diversified in the optical communication system. For that reason, it is also assumed that some communication carriers desire to secure communication capacity of the communication infrastructure by making acceptable communication quality lower than communication quality in the error-free communication. Thus, due to diversification of communication carriers each of which manages communication infrastructure thereof, it has become necessary to consider not only the communication quality but also communication capacity.

Here, in order to secure communication capacity in the communication infrastructure, it is necessary to change communication settings. On the other hand, in a case where the communication settings are to be changed, it is necessary to consider not only the communication capacity but also the communication quality. For that reason, each of the communication carrier changes the communication settings thereof after grasping communication quality statuses before and after changing the communication settings. However, since a communication quality status in an optical communication path is not always constant, a lot of verification time is required to grasp the communication quality status. Therefore, there is a possibility that each of the communication carriers cannot easily grasp the communication quality status in the optical communication path.

It is one of objects of the present disclosure to solve the problems described above and to provide a communication apparatus, a communication control method, a non-transitory computer readable medium, and an optical communication system capable of easily grasping a communication quality status.

Solution to Problem

A communication apparatus according to the present disclosure includes:
  acquisition means configured to acquire measured values of a predetermined number or more, the measured values being measured for communication quality information in an optical communication path;
  estimation means configured to calculate an average value of the measured values thus acquired, generate a first cumulative distribution function of the communication quality information based on the measured values thus acquired, and estimate a second cumulative distribution function of the communication quality information based on measured values in a case where the measured values more than a number of the measured values thus acquired are acquired on a basis of the average value and the first cumulative distribution function; and
  determination means configured to determine a value of the communication quality information as a reference quality value, a cumulative probability in the second cumulative distribution function becoming a predetermined value at the value of the communication quality information.

A communication control method according to the present disclosure includes:
  acquiring measured values of a predetermined number or more, the measured values being measured for communication quality information in an optical communication path;
  calculating an average value of the measured values thus acquired, generating a first cumulative distribution function of the communication quality information based on the measured values thus acquired, and estimating a second cumulative distribution function of the communication quality information based on measured values in a case where the measured values more than a number of the measured values thus acquired are acquired on a basis of the average value and the first cumulative distribution function; and
  determining a value of the communication quality information as a reference quality value, a cumulative probability in the second cumulative distribution function becoming a predetermined value at the value of the communication quality information.

A non-transitory computer readable medium according to the present disclosure is a non-transitory computer readable medium in which a program is stored, the program causing a computer to execute processes to:
  acquire measured values of a predetermined number or more, the measured values being measured for communication quality information in an optical communication path;
  calculate an average value of the measured values thus acquired, generate a first cumulative distribution function of the communication quality information based on the measured values thus acquired, and estimate a second cumulative distribution function of the communication quality information based on measured values in a case where the measured values more than a number of the measured values thus acquired are acquired on a basis of the average value and the first cumulative distribution function; and determine a value of the communication quality information as a reference quality value, a cumulative probability in the second cumulative distribution function becoming a predetermined value at the value of the communication quality information.

An optical communication system according to the present disclosure includes:

a first communication apparatus; and a second communication apparatus connected to the first communication apparatus via an optical communication path, wherein the first communication apparatus is configured to:

acquire measured values of a predetermined number or more by measuring communication quality information in the optical communication path a predetermined number of times or more, and wherein the second communication apparatus is configured to:

calculate an average value of the measured values thus acquired, generate a first cumulative distribution function of the communication quality information based on the measured values thus acquired, and estimate a second cumulative distribution function of the communication quality information based on measured values in a case where the measured values more than a number of the measured values thus acquired are acquired on a basis of the average value and the first cumulative distribution function; and determine a value of the communication quality information as a reference quality value, a cumulative probability in the second cumulative distribution function becoming a predetermined value at the value of the communication quality information.

Advantageous Effects of Invention

According to the present disclosure, there can be provided a communication apparatus, a communication control method, a non-transitory computer readable medium, and an optical communication system capable of easily grasping a communication quality status.

BRIEF DESCRIPTION OF DRAWINGS

FIG. 11 is a view illustrating a hardware configuration example of a communication apparatus and the like.

EXAMPLE EMBODIMENTS

Figure 1:
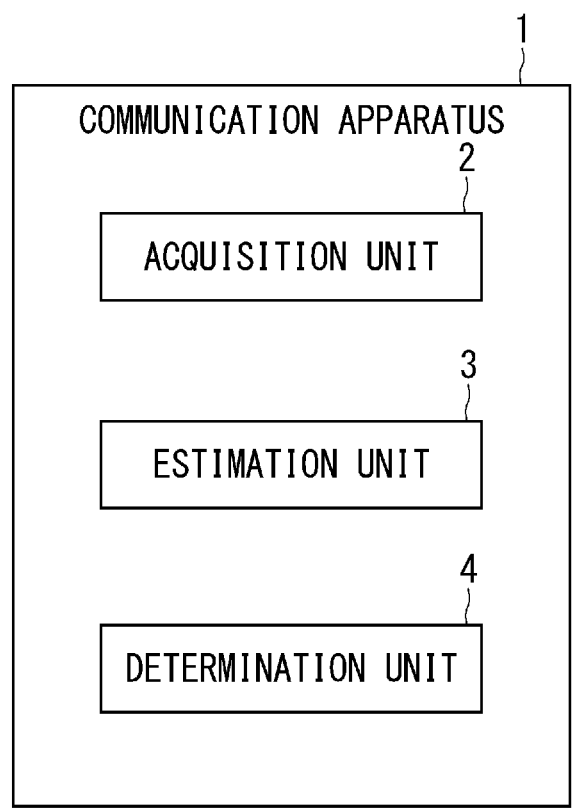
FIG. 1 is a block diagram illustrating a configuration example of a communication apparatus according to a first example embodiment.

Hereinafter, example embodiments of the present disclosure will be described with reference to the drawings. Note that for the sake of clarification of the descriptions, the following description and the drawings will be omitted and simplified as appropriate. Further, in each of the drawings below, the same reference numerals are respectively assigned to the same elements, and redundant description is omitted as necessary.

Investigation Leading to Example Embodiments

First, investigation leading to example embodiments will be described before describing the example embodiments.

Internet traffic via long-distance optical communication cables is increasing rapidly. For that reason, in order to handle the Internet traffic, various techniques have been developed. For example, EDFA (Erbium Doped Fiber Amplifier), WDM (Wavelength Division Multiplexing), QAM (Quadrature Amplitude Modulation), FEC (Forward Error Correction), a DSP (Digital Signal Processor), and a low-loss optical fiber can be cited. Due to the development of such various techniques, communication capacity of an optical communication system has increased along with the increase in the Internet traffic.

Further, in order to provide communication service to a large number of users, optical communication networks have become large-scale, and in order to efficiently multiplex a large amount of data, the optical communication networks have become sophisticated. In optical communication, it is also a problem to efficiently utilize frequency resources for optical communication signals in optical fibers. For that reason, as an optical communication system for the future, a communication system that divides optical communication signal frequency resources into short time periods has been studied. As the communication system, a communication method called an optical path switch, an optical packet switch, or the like can be cited. Further, very high reliability and communication signal quality are required for trunk communication networks. For that reason, current trunk communication networks achieve a very high availability factor and a very low communication signal error rate.

Here, as described above, in recent years, communication carriers each of which manages communication infrastructure thereof become diversified in an optical communication system. With the diversity of the communication carriers, opportunities for changing communication settings in optical communication paths are increasing. When the communication settings of the optical communication paths are changed, impact of the change in the communication settings is large. Therefore, the communication carriers change the communication settings after carrying out careful verification.

However, data for a large number of users are received and transmitted via commercial networks. Thus, the communication carriers generally carry out the verification during a maintenance time for the commercial networks, which is generally a short time. Communication quality of an optical communication signal in optical fibers are generally not constant, but fluctuates. Therefore, the communication carriers specify quality of the optical communication signals by carrying out measurement over a sufficiently long period of time. In this manner, the optical communication networks are required to control the optical communication signals with short time granularity from the viewpoint of frequency resource efficiency. Therefore, in the present disclosure, a configuration is realized in which communication carriers grasp communication quality of optical communication paths by using measured values obtained by being measured in a shorter time than a time required to specify communication quality.

First Example Embodiment

A configuration example of a communication apparatus 1 according to a first example embodiment will be described with reference to FIG. 1. FIG. 1 is a block diagram illustrating a configuration example of the communication apparatus 1 according to the first example embodiment. The communication apparatus 1 is a communication apparatus that constitutes an optical communication system. For example, the communication apparatus 1 may be an optical transmission apparatus, or may be a network monitoring apparatus configured to monitor and control an optical communication system. The communication apparatus 1 includes an acquisition unit 2, an estimation unit 3, and a determination unit 4.

The acquisition unit 2 is configured to acquire measured values of a predetermined number or more. The measured values are measured for communication quality information in an optical communication path. The acquisition unit 2 may acquire the measured values of the predetermined number or more by executing measurement of the communication quality information in the optical communication path for a predetermined measured time a predetermined number of times or more. Alternatively, the acquisition unit 2 may acquire the measured values of the predetermined number or more by receiving measured values of the predetermined number or more thus acquired from another communication apparatus (not illustrated in the drawings), which executes measurement of communication quality information in an optical communication path for a predetermined measured time a predetermined number of times. The predetermined measured time may be set to any time equal to or longer than one second, for example. Further, the predetermined number of times may be set to any number of times equal to or more than 10 times, for example.

The communication quality information may be a BER (Bit Error Rate) indicating an error rate before error correction, or may be a Q-value indicating an optical quality value. The BER may be a BER based on bits contained in a data unit that is generated from an optical communication signal transmitted on the optical communication path, or a BER based on a recovery rate of the data unit generated from the optical communication signal.

The estimation unit 3 is configured to calculate an average value of the measured values acquired by the acquisition unit 2. Further, the estimation unit 3 is also configured to generate a first cumulative distribution function based on the measured values acquired by the acquisition unit 2. The first cumulative distribution function indicates a cumulative distribution function of the communication quality information. The estimation unit 3 generates a cumulative distribution representing a relationship between the values of the communication quality information and cumulative density by using the measured values acquired by the acquisition unit 2. The estimation unit 3 generates the first cumulative distribution function by obtaining an approximate curved line for the generated cumulative distribution using a least squares method, for example.

The estimation unit 3 is configured to estimate a second cumulative distribution function on the basis of the calculated average value and the generated first cumulative distribution function. The second cumulative distribution function indicates a cumulative distribution function of the communication quality information based on the measured values in a case where measured values more than the number of measured values thus acquired are acquired. In other words, the estimation unit 3 estimates a cumulative distribution function of the communication quality information on the basis of the average value and the first cumulative distribution function. The cumulative distribution of the communication quality information is generated on the basis of measured values in a case where the measured values are acquired for a total measured time longer than a total measured time required for acquiring measured values by the acquisition unit 2.

The determination unit 4 is configured to determine a value of the communication quality information as a reference quality value. A cumulative probability becomes a predetermined value at the value of the communication quality information in the second cumulative distribution function. The reference quality value is a quality value that serves as a reference for evaluating a communication quality status of an optical communication path, and is a quality value used for evaluating whether the communication quality status satisfies a required quality value required by a communication carrier or not. The required quality value is a threshold value of the communication quality information at which communication cannot be established on the optical communication path.

Figure 2:
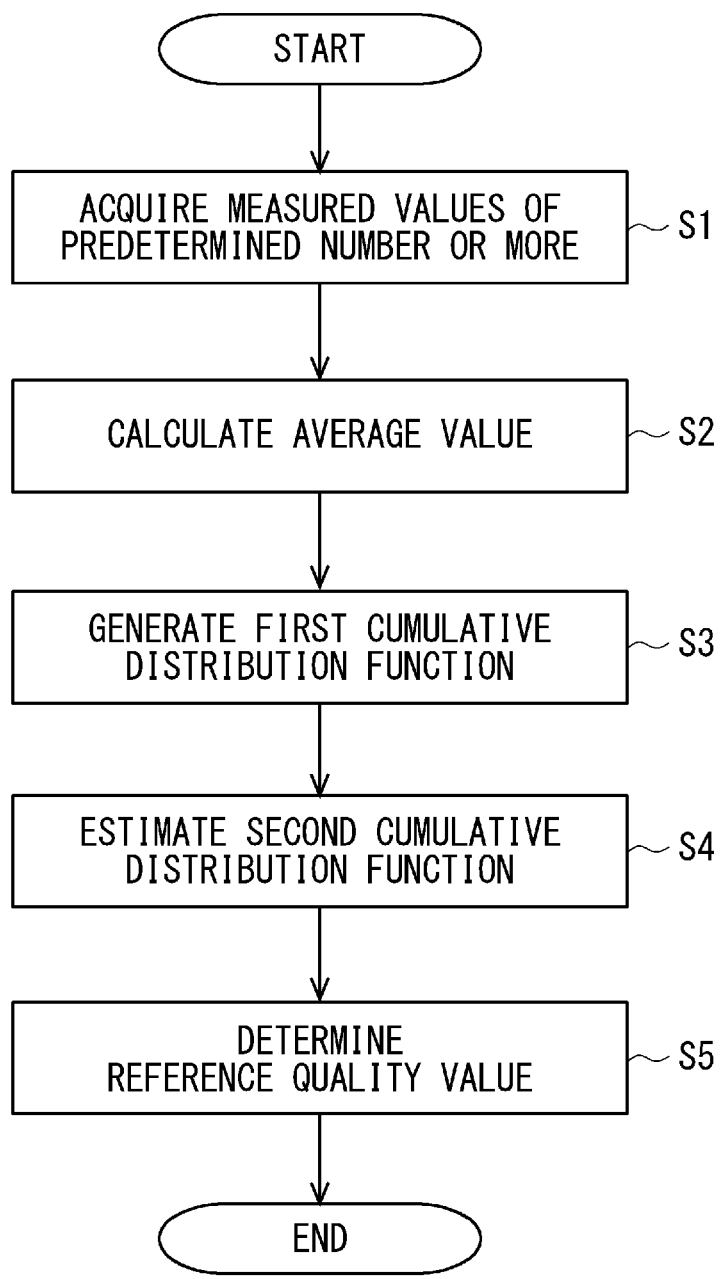
FIG. 2 is a flowchart illustrating an operation example of the communication apparatus according to the first example embodiment.

Next, an operation example of the communication apparatus 1 according to the first example embodiment will be described with reference to FIG. 2. FIG. 2 is a flowchart illustrating the operation example of the communication apparatus 1 according to the first example embodiment.

The acquisition unit 2 acquires measured values of a predetermined number or more measured for communication quality information in an optical communication path (Step S1).

The measured values are measured for communication quality information in an optical communication path. The acquisition unit 2 may acquire the measured values of the predetermined number or more by executing measurement of the communication quality information in the optical communication path for a predetermined measured time a predetermined number of times or more. Alternatively, the acquisition unit 2 may acquire the measured values of the predetermined number or more by receiving measured values of the predetermined number or more thus acquired from another communication apparatus (not illustrated in the drawings), which executes measurement of communication quality information in an optical communication path for a predetermined measured time a predetermined number of times.

The estimation unit 3 calculates an average value of the measured values of the predetermined number or more acquired by the acquisition unit 2 (Step S2).

The estimation unit 3 generates a first cumulative distribution function based on the measured value acquired by the acquisition unit 2 (Step S3). The first cumulative distribution function indicates a cumulative distribution function of the communication quality information.

The estimation unit 3 generates a cumulative distribution representing a relationship between the values of the communication quality information and cumulative density by using the measured values acquired by the acquisition unit 2. The estimation unit 3 generates the first cumulative distribution function by obtaining an approximate curved line for the generated cumulative distribution using a least squares method, for example.

The estimation unit 3 estimates a second cumulative distribution function on the basis of the calculated average value and the generated first cumulative distribution function (Step S4). The second cumulative distribution function indicates a cumulative distribution function of the communication quality information based on the measured values in a case where measured values more than the number of measured values thus acquired are acquired.

The determination unit 4 determines a value of the communication quality information as a reference quality value (Step S5). A cumulative probability becomes a predetermined value at the value of the communication quality information in the second cumulative distribution function.

The estimation unit 3 calculates the average value of the measured values thus acquired on the basis of the measured values of the predetermined number or more measured for the communication quality information in the optical communication path, and generates the first cumulative distribution function. The estimation unit 3 estimates, on the basis of the calculated average value and the generated first cumulative distribution function, the second cumulative distribution function of the communication quality information in a case where the measured values more than the number of the measured values thus acquired are acquired. The determination unit 4 determines the reference quality value indicating the quality value at which the cumulative probability becomes the predetermined value in the second cumulative distribution function. Thus, the communication apparatus 1 can determine the reference quality value when the measured values more than the number of measured values thus actually measured are acquired on the basis of the measured values of the communication quality information. For that reason, the communication carrier can determine the reference quality value when a large number of measured values is acquired, without acquiring a large number of measured values by using the communication apparatus 1. In other words, by using the communication apparatus 1, the communication carrier can determine the reference quality value of the measured values, which is assumed to be acquired for the total measured time longer than the total measured time thus actually measured, on the basis of the measured values thus acquired for the shorter total measured time. Therefore, according to the communication apparatus 1 of the first example embodiment, the communication carrier can easily grasp the communication quality status.

Second Example Embodiment

Next, a second example embodiment will be described. The second example embodiment is a detailed version of the first example embodiment.

<Configuration Example of Optical Communication System>

Figure 3:
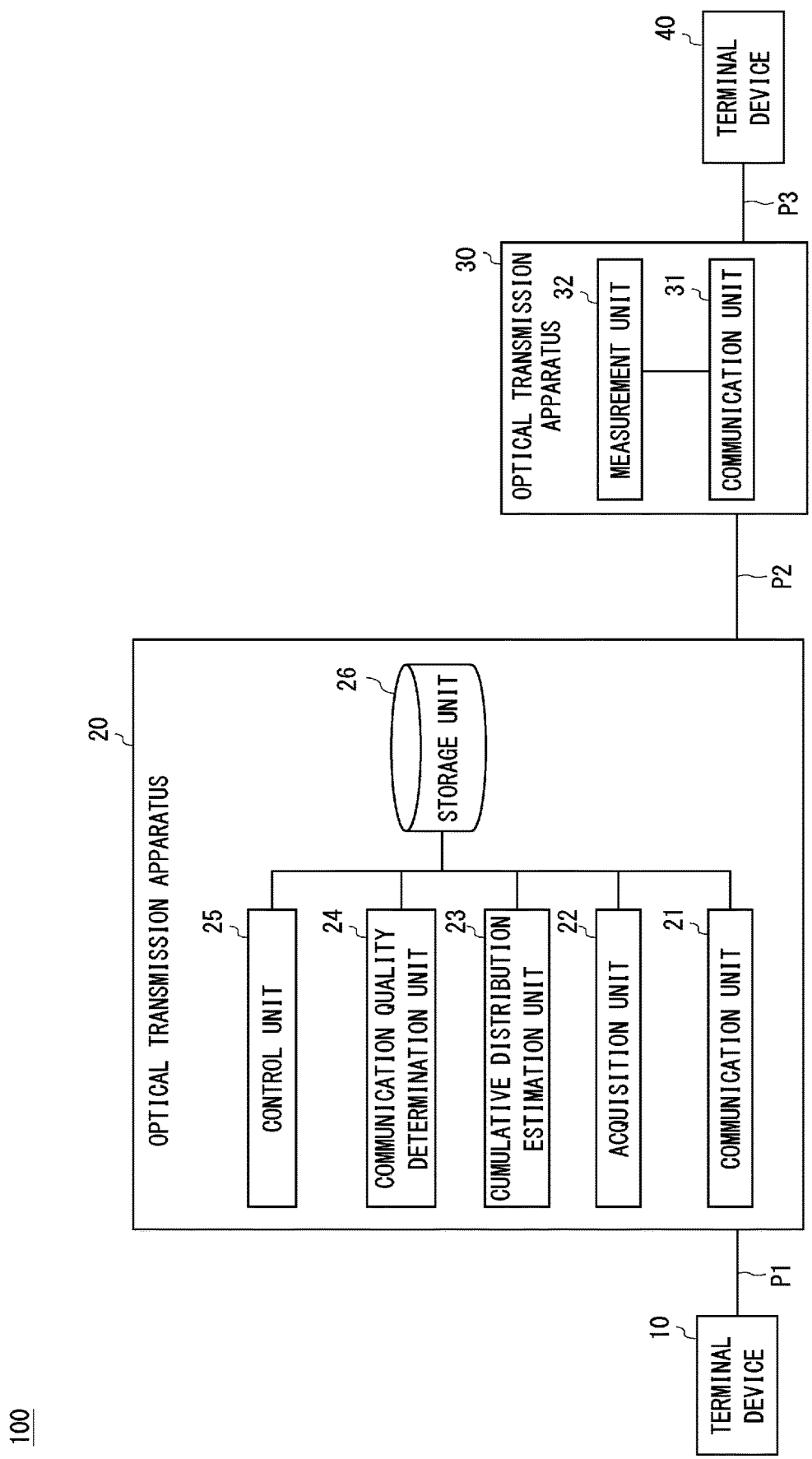
FIG. 3 is a view illustrating a configuration example of an optical communication system according to a second example embodiment.

A configuration example of an optical communication system 100 according to the second example embodiment will be described with reference to FIG. 3. FIG. 3 is a view illustrating the configuration example of the optical communication system 100 according to the second example embodiment. The optical communication system 100 includes terminal devices 10 and 40, and optical transmission apparatuses 20 and 30.

Each of the terminal devices 10 and 40 is, for example, a communication apparatus provided on land. For example, the terminal device 10 may be an end-user terminal managed by an end user, or a relay apparatus or the like provided between an end-user terminal and the optical transmission apparatus 20. For example, the terminal device 40 may be an end-user terminal managed by an end user, or a relay apparatus or the like provided between an end-user terminal and the optical transmission apparatus 30. Note that in the following description, the terminal devices 10 and 40 are assumed to be end-user terminals.

The terminal device 10 is connected to the optical transmission apparatus 20 via a communication path P1 to communicate with the optical transmission apparatus 20 via the communication path P1. The terminal device 40 is connected to the optical transmission apparatus 30 via a communication path P3 to communicate with the optical transmission apparatus 30 via the communication path P3. Each of the communication paths P1 and P3 is an access line, for example.

The optical transmission apparatuses 20 and 30 are connected to each other via an optical communication path P2 to execute communication via the optical communication path P2. The optical communication path P2 is composed of an optical cable, such as an optical fiber, placed on the seabed, for example. The optical transmission apparatuses 20 and 30 respectively convert optical communication signals received and transmitted via the optical communication path P2 into electrical signals received and transmitted via the communication paths P1 and P3. The optical transmission apparatuses 20 and 30 respectively convert electrical signals received and transmitted via the communication paths P1 and P3 into optical communication signals received and transmitted via the optical communication path P2.

The optical transmission apparatuses 20 and 30 are compatible with a WDM (Wavelength Division Multiplexing) system, and transmit data received and transmitted via the optical communication path P2 to the opposing optical transmission apparatus via a plurality of communication channels configured in a plurality of wavelength bands. Each communication channel may be referred to as an optical spectrum.

The optical transmission apparatus 20 transmits data transmitted from the terminal device 10 to the terminal device 40 via the optical communication path P2 and the optical transmission apparatus 30. The optical transmission apparatus 30 transmits data transmitted from the terminal device 40 to the terminal device 10 via the optical communication path P2 and the optical transmission apparatus 20.

<Configuration Example of Optical Transmission Apparatus>

Next, a configuration example of each of the optical transmission apparatuses 20 and 30 will be described. First, a configuration example of the optical transmission apparatus 30 will be described before describing a configuration example of the optical transmission apparatus 20, and then, the configuration example of the optical transmission apparatus 30 will be described.

The optical transmission apparatus 30 includes a communication unit 31 and a measurement unit 32.

The communication unit 31 executes communication with the terminal device 40, and executes communication with the optical transmission apparatus 20. The communication unit 31 receives an optical communication signal from the optical transmission apparatus 20 via the optical communication path P2, and restores a data unit on the basis of a bit string contained in the optical communication signal. The communication unit 31 extracts a communication frame from the data unit, and transmits it to the terminal device 40 via the communication path P3. The communication unit 31 receives a communication frame from the terminal device 40 via the communication path P3. The communication unit 31 stores the received communication frame in a data unit, and converts the data unit into an optical communication signal. The communication unit 31 transmits the optical communication signal to the optical transmission apparatus 20 via the optical communication path P2.

The communication unit 31 receives an acquisition request from the optical transmission apparatus 20, and notifies (or transmits to) the measurement unit 32 that the acquisition request is received. The acquisition request is a request from the optical transmission apparatus 20, and is a message that the optical transmission apparatus 20 requests the measurement unit 32 to execute measurement of communication quality information in the optical communication path P2. The communication unit 31 transmits a plurality of measured values acquired by the measurement unit 32 to the optical transmission apparatus 20 via the optical communication path P2.

In a case where the acquisition request is received, the measurement unit 32 measures the communication quality information in the optical communication path P2, and acquires measured values of a predetermined number or more. Each time an acquisition request is received from the optical transmission apparatus 20, the measurement unit 32 executes measurement for a predetermined measured time a predetermined number of times or more to acquire the measured values of the predetermined number or more. The measurement unit 32 transmits the measured values of the predetermined number or more thus acquired to the optical transmission apparatus 20 via the communication unit 31.

The measurement unit 32 measures communication quality information in an optical communication path for a predetermined measured time to acquire one measured value. The predetermined measured time is a measured time set to any time equal to or longer than one second, for example. The measurement unit 32 executes the measurement for the predetermined measured time a predetermined number of times or more until the measured values of the predetermined number or more are acquired. The predetermined number of times is the number of times set to an arbitrary number of times equal to or more than 10 times, for example. The more the predetermined number of times is, the better accuracy of a result becomes. Thus, it is preferable that the predetermined number of times is 500 times or more, for example. However, since the total measured time becomes longer as the number of times increases, the predetermined number of times is determined in consideration of the accuracy and the total measured time.

The communication quality information may be a BER (Bit Error Rate) indicating an error rate before error correction, or may be a Q-value indicating an optical quality value. The BER may be a BER based on bits contained in a data unit that is generated from an optical communication signal transmitted on the optical communication path, or a BER based on a recovery rate of the data unit generated from the optical communication signal.

In a case where the communication quality information is a BER based on bits contained in a data unit that is generated from an optical communication signal transmitted on the optical communication path, the measurement unit 32 measures a bit string contained in the data unit restored by the communication unit 31 multiple times. The measurement unit 32 may calculate the BER of the measured bit string to acquire the calculated BER as a measured value.

In a case where the communication quality information is a BER based on a recovery rate of the data unit generated from the optical communication signal, the measurement unit 32 measures the number of times the communication unit 31 tried to restore the data unit and the number of times the communication unit 31 succeeded or failed restoration of the data unit. The measurement unit 32 calculates the BER on the basis of the number of times of trials, and the number of times of success or failure to acquire the calculated BER as a measured value.

In a case where the communication quality information is a Q-value, the Q-value can be calculated by logarithmizing the BER described above. Therefore, the measurement unit 32 calculates the BER, and logarithmizes the calculated BER, thereby calculating the Q-value. Note that the measurement unit 32 may measure probability distribution of each of signal values (0 and 1) of the optical communication signal received and transmitted via the optical communication path P2 and demodulated signal levels. The measurement unit 32 may calculate a Q-value on the basis of dispersion of the probability distribution of the optical communication signal values of 1 and 0 and a difference value of the demodulated signal levels, and acquire the calculated Q-value as the measured value.

Next, the optical transmission apparatus 20 will be described. The optical transmission apparatus 20 corresponds to the communication apparatus 1 according to the first example embodiment. The optical transmission apparatus 20 includes a communication unit 21, an acquisition unit 22, a cumulative distribution estimation unit 23, a communication quality determination unit 24, a control unit 25, and a storage unit 26.

The communication unit 21 executes communication with the terminal device 10 and communication with the optical transmission apparatus 30. The communication unit 21 receives the optical communication signal from the optical transmission apparatus 30 via the optical communication path P2, and restores a data unit on the basis of a bit string contained in the optical communication signal. The communication unit 21 extracts a communication frame from the data unit, and transmits it to the terminal device 10 via the communication path P1. The communication unit 21 receives the communication frame from the terminal device 10 via the communication path P1. The communication unit 21 stores the received communication frame in the data unit, and converts the data unit into an optical communication signal. The communication unit 21 transmits the optical communication signal to the optical transmission apparatus 30 via the optical communication path P2.

The communication unit 21 receives a quality status confirming request and a parameter from a communication carrier managing the optical communication path P2 to adjust request. The quality status confirming request is a request for confirming a current communication quality status in the optical communication path P2, for example. The parameter adjusting request is a request from the communication carrier managing the optical communication path P2 to adjust a parameter related to communication settings for the optical communication path P2 in light of the communication quality status in the optical communication path P2, for example. The communication unit 21 receives the quality status confirming request and the parameter adjusting request from the communication carrier described above via a network monitoring apparatus (not illustrated in the drawings), for example. The communication unit 21 transmits the quality status confirming request and the parameter adjusting request to the cumulative distribution estimation unit 23 and the communication quality determination unit 24. Further, the communication unit 21 transmits the parameter adjusting request to the control unit 25.

When the quality status confirming request is received, the communication unit 21 transmits an acquisition request to the communication unit 31. When the parameter adjusting request is received, the communication unit 21 transmits an acquisition request to the communication unit 31. Further, in a case where the communication unit 21 receives the parameter adjusting request, the control unit 25 (will be described later) changes a parameter in light of the communication quality status in the optical communication path P2. The communication unit 21 transmits the acquisition request to the communication unit 31 each time the control unit 25 changes the parameter.

After transmitting the acquisition request, the communication unit 21 receives the measured values of the predetermined number or more acquired by the measurement unit 32 from the communication unit 31 via the optical communication path P2. The communication unit 21 outputs the measured values of the predetermined number or more thus received to the acquisition unit 22.

The acquisition unit 22 correspond to the acquisition unit 2 according to the first example embodiment. The acquisition unit 22 acquires the measured values of the predetermined number or more measured for the communication quality information in the optical communication path P2. The acquisition unit 22 acquires the measured values of the predetermined number or more acquired by the measurement unit 32 via the communication unit 21.

The cumulative distribution estimation unit 23 corresponds to the estimation unit 3 according to the first example embodiment. The cumulative distribution estimation unit 23 calculates an average value of the measured values thus acquired in a case where the measured values of the predetermined number or more are acquired in response to the quality status confirming request, and generates a first cumulative distribution function based on the measured values thus acquired, which indicates a cumulative distribution function of the communication quality information. The cumulative distribution estimation unit 23 estimates a second cumulative distribution function based on measured values in a case where the measured values more than the number of the measured values thus acquired are acquired on the basis of the calculated average value and the generated first cumulative distribution function. The second cumulative distribution function indicates a cumulative distribution function of the communication quality information. The first cumulative distribution function is known because it is a function based on the measured values thus acquired. However, the second cumulative distribution function is unknown because it is a cumulative distribution function in a case where it is assumed that the measured values more than the number of the measured values thus acquired are acquired. For that reason, the cumulative distribution estimation unit 23 estimates the unknown second cumulative distribution function on the basis of the calculated average value and the known first cumulative distribution function.

Specifically, in a case where the measured values of the predetermined number or more are acquired in response to the quality status confirming request, the cumulative distribution estimation unit 23 calculates the average value of the measured values thus acquired. In a case where the measured values of the predetermined number or more are acquired in response to the quality status confirming request, the cumulative distribution estimation unit 23 generates the first cumulative distribution function based on the measured values of the predetermined number or more thus acquired. The first cumulative distribution function indicates a cumulative distribution function of communication quality information. The cumulative distribution estimation unit 23 generates a cumulative distribution based on the measured values thus acquired. The cumulative distribution has a horizontal axis representing a value of communication quality information and a vertical axis representing a cumulative probability. The cumulative distribution estimation unit 23 generates the first cumulative distribution function by obtaining an approximate curved line with respect to points plotted as the generated cumulative distribution using a least squares method, for example.

The cumulative distribution estimation unit 23 is configured to calculate a slope in a region where a change in the cumulative probability in the first cumulative distribution function is steep. It is assumed that a histogram of a value of the communication quality information regarding an optical communication signal transmitted on the optical communication path P2 follows a Gaussian distribution. For that reason, a region where the cumulative probability in the first cumulative distribution function becomes 0.1 to 0.9, for example, is the region where the change in the cumulative probability is steep. Therefore, the cumulative distribution estimation unit 23 calculates the slope in the region where the change in the cumulative probability in the first cumulative distribution function is steep, such as the region where the cumulative probability becomes 0.1 to 0.9, for example.

The cumulative distribution estimation unit 23 may calculate a slope at a point where the cumulative probability in the first cumulative distribution function becomes 0.5, for example, as the slope in the region where the change in the cumulative probability is steep. Alternatively, the cumulative distribution estimation unit 23 may select a plurality of points where the cumulative probability becomes a cumulative probability within a predetermined range, such as from 0.1 to 0.9, of points that satisfy the first cumulative distribution function, for example, and calculate the slope in the region where the change in the cumulative probability is steep on the basis of the slope at the selected point. The cumulative distribution estimation unit 23 may calculate a slope at each of the plurality of points thus selected; calculate an average value, a central value, the minimum value, or the maximum value of the calculated slopes; and calculate the calculated value as the slope in the region where the change in the cumulative probability is steep. The cumulative distribution estimation unit 23 stores the average value and the slopes thus calculated in the storage unit 26.

The cumulative distribution estimation unit 23 estimates the second cumulative distribution function by approximating the second cumulative distribution function in a region where a change in a cumulative probability in the second cumulative distribution function is steep by a straight line based on the average value and the slope. The cumulative distribution estimation unit 23 determines a straight line that passes through a point where the calculated average value is a value of the communication quality information at the point where the cumulative probability is 0.5 and has the calculated slope as a slope of the straight line. The cumulative distribution estimation unit 23 estimates the second cumulative distribution function by approximating the second cumulative distribution function in the region where the change in the cumulative probability in the second cumulative distribution function is steep by the determined straight line.

In a case where a parameter adjusting request is received from the communication unit 21 and the control unit 25 does not change a parameter, the cumulative distribution estimation unit 23 executes a process similar to that of the quality status confirming request. Further, in a case where a parameter adjusting request is received from the communication unit 21 and the control unit 25 changes a parameter, the cumulative distribution estimation unit 23 executes a process according to the changed parameter.

In a case where the control unit 25 changes a dispersion dissimilarity parameter in which a dispersion of values of the communication quality information depends upon a value of the parameter, the cumulative distribution estimation unit 23 executes a process similar to that of the quality status confirming request. Specifically, in a case where a dispersion dissimilarity parameter is changed, the cumulative distribution estimation unit 23 generates a first cumulative distribution function based on the measured values thus acquired after the dispersion dissimilarity parameter is changed. The cumulative distribution estimation unit 23 calculates a slope in a region where a cumulative probability of a first cumulative distribution function based on the measured values thus acquired after the dispersion dissimilarity parameter is changed is steep. The cumulative distribution estimation unit 23 calculates an average value of the measured values thus acquired after the dispersion dissimilarity parameter is changed. The cumulative distribution estimation unit 23 determines a straight line that passes through a point where a value of communication quality information whose cumulative probability becomes 0.5 is the calculated average value and has the calculated slope as a slope thereof. The cumulative distribution estimation unit 23 approximates the determined straight line by the second cumulative distribution function in a region where a change in cumulative probability in the second cumulative distribution function is steep. The cumulative distribution estimation unit 23 stores the average value and the slope thus calculated in the storage unit 26 together with a parameter name changed by the control unit 25 and parameter value before and after change.

For example, the dispersion dissimilarity parameter may include a modulation system in the optical communication path P2 and a guard band of a communication channel in the optical communication path P2. For example, it is assumed that a range of values of communication quality information in which a cumulative probability is from 0 to 100 in a cumulative distribution function when the modulation system is QPSK (Quadra phase-shift keying) becomes narrower even in a case of 16QAM (quadrature amplitude modulation). Thus, it is assumed that, in a case where an order of the modulation system is changed, the dispersion of the values of the communication quality information is different. Further, it is also assumed that, when the guard band of each communication channel in the optical communication path P2 is changed so as to widen, the range of the values of the communication quality information in which cumulative density of a cumulative density function is from 0 to 100 also becomes narrower as well as the modulation system. For that reason, in a case where the dispersion dissimilarity parameter is changed, the cumulative distribution estimation unit 23 calculates an average value of the measured values thus acquired after the dispersion dissimilarity parameter is changed. The cumulative distribution estimation unit 23 calculates the slope in the region where the change in the cumulative probability of the first cumulative distribution function based on the measured values thus acquired after the dispersion dissimilarity parameter is changed is steep.

Note that the order of modulation system may be referred to as a multilevel degree of the modulation system. Further, the fact that the dispersions of the values of the communication quality information are dissimilar to each other before and after the parameter is changed means a relationship in which the cumulative distribution functions are dissimilar to each other before and after the parameter is changed. Therefore, the dispersion dissimilarity parameter may be referred to as a parameter whose cumulative distribution functions are dissimilar.

On the other hand, in a case where the control unit 25 changes a dispersion similarity parameter in which a dispersion of values of the communication quality information does not depend upon a value of the parameter, the cumulative distribution estimation unit 23 calculates, as a margin value, a difference between an average value before the parameter is changed and a reference quality value determined before the parameter is changed. The cumulative distribution estimation unit 23 calculates an average value of measured values acquired after the dispersion similarity parameter is changed. The reference quality value is a value of the communication quality information at which the cumulative probability becomes a predetermined value in the second cumulative distribution function, and is a value determined by the communication quality determination unit 24 (will be described later).

In a case where the dispersion similarity parameter is changed, the slope of the straight line by which the second cumulative distribution function is approximated is the same before and after the dispersion similarity parameter is changed. For that reason, the cumulative distribution estimation unit 23 does not determine a straight line that approximates the second cumulative distribution function after the parameter is changed, but calculates, as the margin value, a shift amount of the straight line before and after the dispersion similarity parameter is changed. The cumulative distribution estimation unit 23 stores the average value and the margin value thus calculated in the storage unit 26 together with the parameter name changed by the control unit 25 and the values before and after change. Note that, even in a case where the dispersion similarity parameter is changed, the margin value is not changed, and thus, the cumulative distribution estimation unit 23 may calculate the margin value only once in a case where the dispersion similarity parameter is changed.

The dispersion similarity parameter is optical transmission power in the optical communication path P2, the number of communication channels in the optical communication path P2, and the like, for example. Note that the fact that the dispersions before and after the parameter is changed are similar means a relationship in which the cumulative distribution functions are similar to each other before and after the parameter is changed. Therefore, the dispersion similarity parameter may be referred to as a parameter whose cumulative distribution functions are similar.

The communication quality determination unit 24 corresponds to the determination unit 4 according to the first example embodiment. In a case where the measured values of the predetermined number or more are acquired in response to the quality status confirming request, the communication quality determination unit 24 determines, as a reference quality value, a value of the communication quality information at which the cumulative probability is a predetermined value by using the straight line obtained by approximating the second cumulative distribution function. The communication quality determination unit 24 considers that the reference quality value exists on the straight line based on the average value and the slope thus calculated, and determine, as the reference quality value, the value of communication quality information of the point on the straight line at which the cumulative probability becomes the predetermined value. The communication quality determination unit 24 stores the determined reference quality value in the storage unit 26 so as to be associated with the average value and the slope used for calculating the reference quality value.

In a case where the parameter adjusting request is received from the communication unit 21 and the control unit 25 does not change a parameter, the communication quality determination unit 24 executes a process similar to that of the quality status confirming request. Further, in a case where the parameter adjusting request is received from the communication unit 21 and the control unit 25 changes a parameter, the communication quality determination unit 24 executes a process according to the changed parameter.

In a case where the control unit 25 changes the dispersion dissimilarity parameter, the communication quality determination unit 24 executes a process similar to that of the quality status confirming request. Specifically, the communication quality determination unit 24 determines, as the reference quality value, the value of the communication quality information at which the cumulative probability becomes the predetermined value by using the straight line obtained by approximating the second cumulative distribution function. The communication quality determination unit 24 determines, as the reference quality value, the value of the communication quality information at the point on the straight line based on the average value and the slope thus calculated, at which the cumulative probability becomes the predetermined value. The communication quality determination unit 24 stores the reference quality value after the parameter is changed in the storage unit 26 so as to be associated with the parameter name changed by the control unit 25 and the values before and after change.

On the other hand, in a case where the control unit 25 changes the dispersion similarity parameter, the communication quality determination unit 24 determines the reference quality value after the dispersion similarity parameter is changed on the basis of the average value after the dispersion similarity parameter is changed and the margin value. The communication quality determination unit 24 determines, as the reference quality value after the dispersion similarity parameter is changed, a value obtained by subtracting the margin value from the average value after the dispersion similarity parameter is changed. In a case where the dispersion similarity parameter is changed, the slope of the straight line by which the second cumulative distribution function is approximated becomes the same. For that reason, the communication quality determination unit 24 determines the reference quality value after the parameter is changed by subtracting the margin value from the average value after the dispersion similarity parameter is changed. The communication quality determination unit 24 stores the reference quality value after the parameter is changed in the storage unit 26 so as to be associated with the parameter name changed by the control unit 25 and the values before and after change.

In a case where the parameter adjusting request is received, the control unit 25 changes a parameter regarding the optical communication path P2 and related to communication settings in the optical communication path P2. The control unit 25 changes the parameter so that the reference quality value after the parameter is changed satisfies a required quality value. The required quality value is a threshold value of the communication quality information at which communication cannot be established in the optical communication path P2, and is a value of the communication quality information at which a FER (Frame Error Rate) indicating an error rate after error correction becomes a predetermined value.

The control unit 25 determines whether the reference quality value determined by the communication quality determination unit 24 is a value larger than the required quality value or not, thereby determining whether the reference quality value determined by the communication quality determination unit 24 satisfies the required quality value or not. In a case where the reference quality value satisfies the required quality value, the control unit 25 changes the parameter so that the reference quality value becomes lower. In a case where the reference quality value does not satisfy the required quality value, the control unit 25 changes the parameter so that the reference quality value becomes higher. In a case where the parameter is changed, the control unit 25 transmits the changed parameter name and the parameter values before and after change to the communication unit 21, the cumulative distribution estimation unit 23, and the communication quality determination unit 24.

In a case where the reference quality value before the parameter is changed satisfies the required quality value and a modulation system is changed, the control unit 25 changes the modulation system so that an order of the modulation system increases. In a case where the modulation system before the parameter is changed is QPSK, the control unit 25 increases the order of the modulation system to change the modulation system into 8QAM. In a case where the modulation system before the parameter is changed is 8QAM, the control unit 25 increases the order of the modulation system to change the modulation system into 16QAM. In a case where the modulation system before the parameter is changed is 16QAM, the control unit 25 increases the order of the modulation system to change the modulation system into 32QAM.

On the other hand, in a case where the reference quality value before the parameter is changed does not satisfy the required quality value and the modulation system is changed, the control unit 25 changes the modulation system so that the order of the modulation system decreases. In a case where the modulation system before the parameter is changed is 32QAM, the control unit 25 reduces the order of the modulation system to change the modulation system into 16QAM. In a case where the modulation system before the parameter is changed is 16QAM, the control unit 25 reduces the order of the modulation system to change the modulation system into 8QAM. In a case where the modulation system before the parameter is changed is 8QAM, the control unit 25 reduces the order of the modulation system to change the modulation system into QPSK.

In a case where the reference quality value before the parameter is changed satisfies the required quality value and a guard band is changed, the control unit 25 changes the guard band so that the guard band becomes narrower than a current value thereof. In other words, the control unit 25 narrows the guard band of each communication channel from the current guard band to change the guard band so that interference with adjacent communication channels becomes larger, but the bandwidth of each communication channel becomes wider.

On the other hand, in a case where the reference quality value before the parameter is changed does not satisfy the required quality value and the guard band is changed, the control unit 25 changes the guard band so that the guard band becomes wider than the current value thereof. In other words, the control unit 25 widens the guard band of each communication channel from the current guard band to change the guard band so that the interference with the adjacent communication channels becomes smaller and the bandwidth of each communication channel becomes narrower.

In a case where the reference quality value before the parameter is changed satisfies the required quality value and optical transmission power in the optical communication path P2 is changed, the control unit 25 changes the optical transmission power so that the optical transmission power becomes smaller than a current value thereof. In other words, the control unit 25 changes the optical transmission power so that the reference quality value becomes lower, but the power consumption is lowered.

On the other hand, in a case where the reference quality value before the parameter is changed does not satisfy the required quality value and the optical transmission power in the optical communication path P2 is changed, the control unit 25 changes the optical transmission power so that the optical transmission power becomes larger than the current value thereof. In other words, the control unit 25 changes the optical transmission power so that the power consumption increases, but the reference quality value becomes higher.

In a case where the reference quality value before the parameter is changed satisfies the required quality value and the number of communication channels in the optical communication path P2 is changed, the control unit 25 changes the number of communication channels so that the number of communication channels increases from a current value thereof. In other words, the control unit 25 changes the number of communication channels so that the reference quality value becomes lower, but communication capacity increases.

On the other hand, in a case where the reference quality value before the parameter is changed does not satisfy the required quality value and the number of communication channels in the optical communication path P2 is changed, the control unit 25 changes the number of communication channels so that the number of communication channels decreases from the current value thereof. In other words, the control unit 25 changes the number of communication channels so that the communication capacity decreases, but the reference quality value becomes higher.

The storage unit 26 stores the average value, the slope, the margin value, the reference quality value, the changed parameter name, and the values before and after change, which were calculated, in accordance with controls of the cumulative distribution estimation unit 23 and the communication quality determination unit 24.

<Operation Example of Optical Transmission Apparatus>

Figure 4:
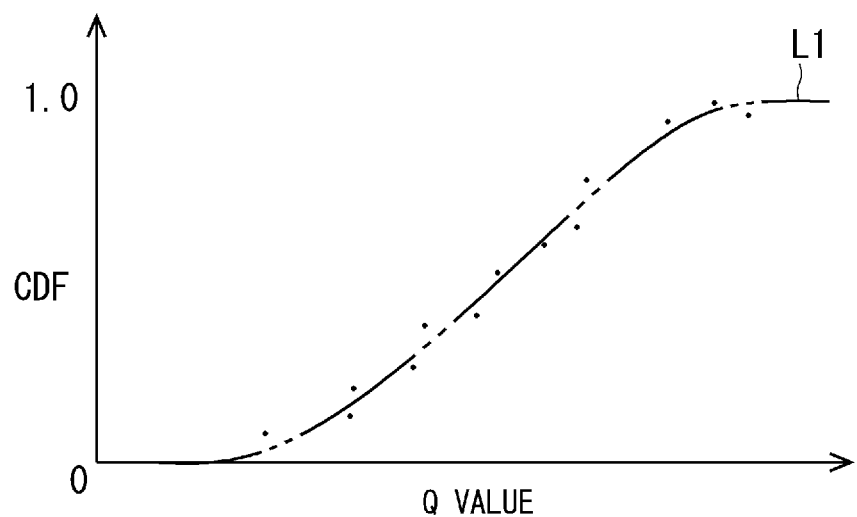
FIG. 4 is a view illustrating an operation outline of an optical transmission apparatus according to the second example embodiment.
Figure 5:
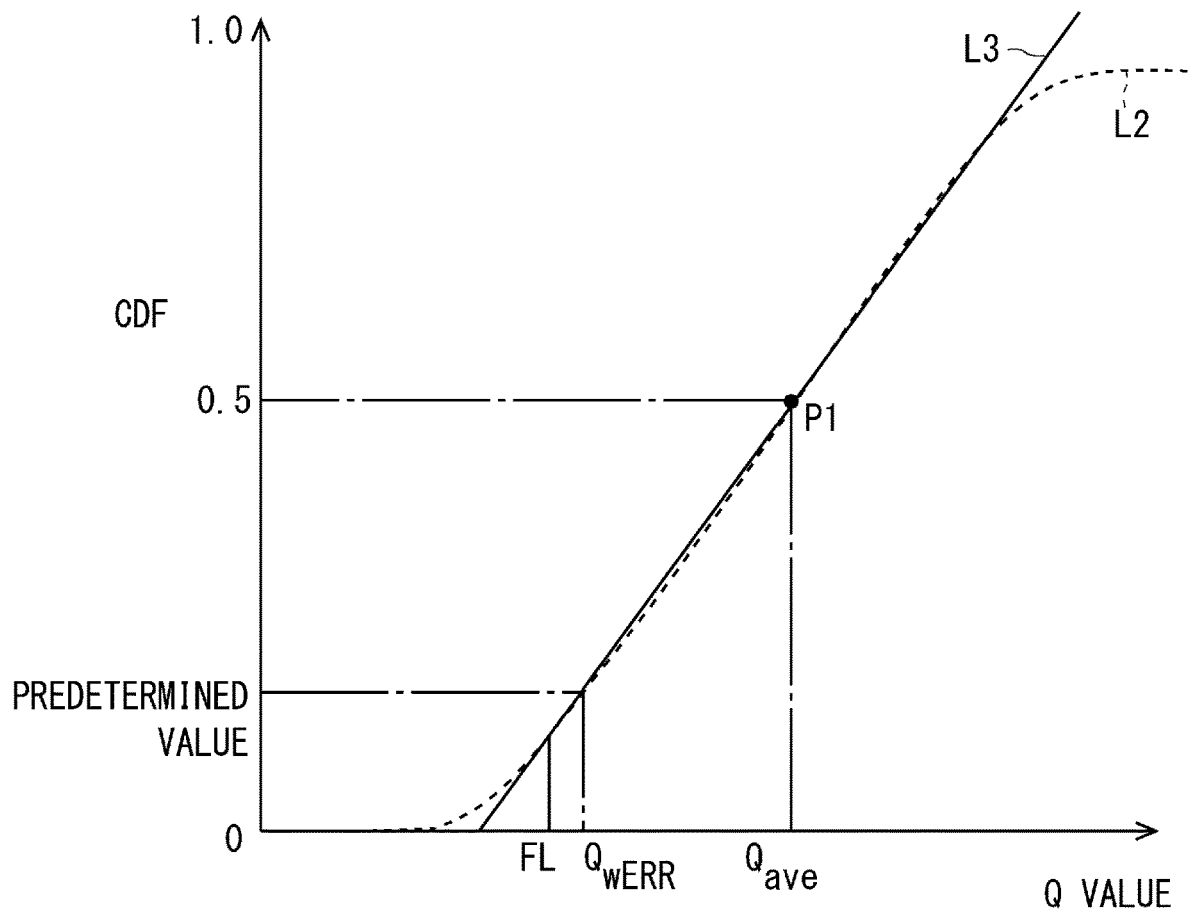
FIG. 5 is a view illustrating an operation outline of the optical transmission apparatus according to the second example embodiment.
Figure 6:
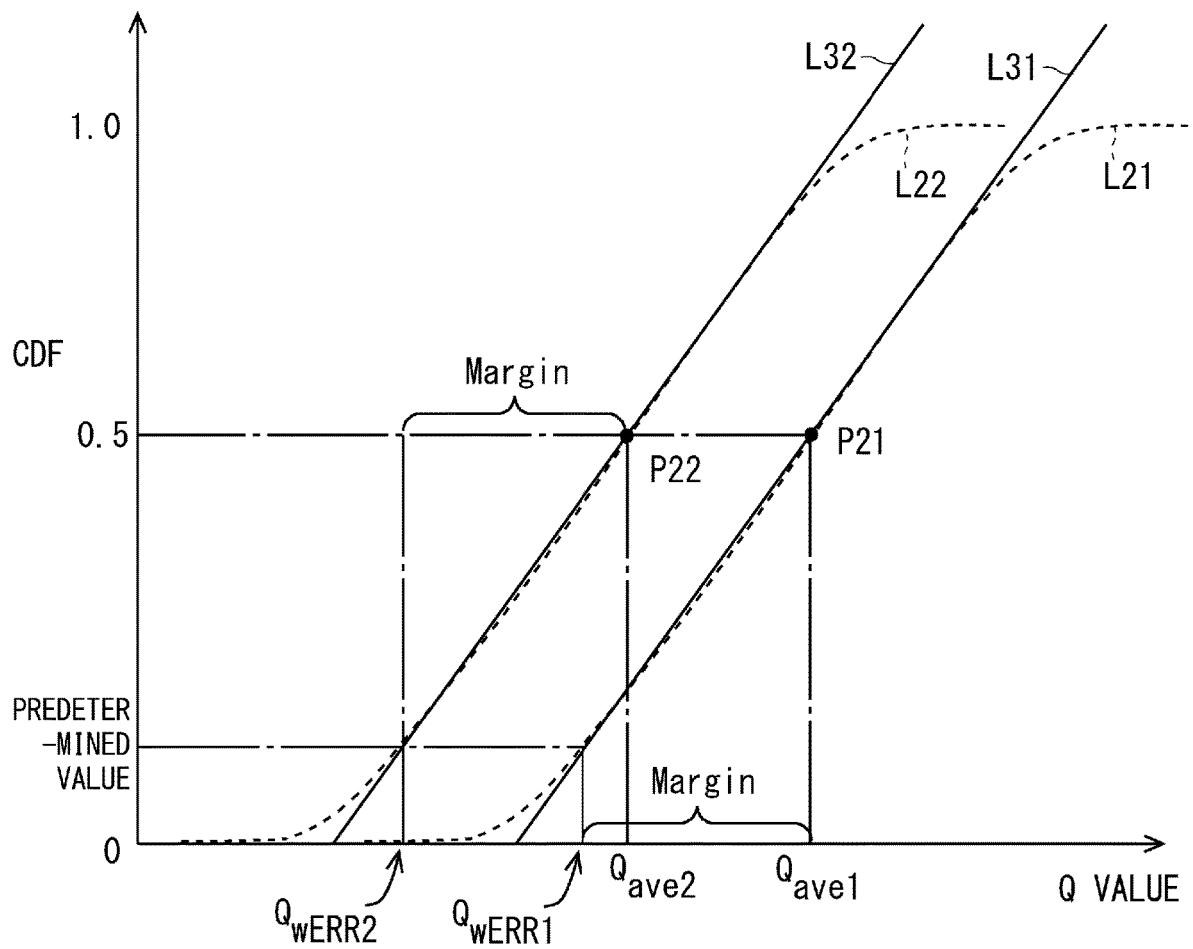
FIG. 6 is a view illustrating an operation outline of the optical transmission apparatus according to the second example embodiment.

Next, an operation example of the optical transmission apparatus according to the second example embodiment will be described. First, an operation outline of the optical transmission apparatus 20 according to the second example embodiment will be described with reference to FIG. 4 to FIG. 6. FIG. 4 to FIG. 6 are views each illustrating an operation outline of the optical transmission apparatus according to the second example embodiment.

<Operation Outline at Time of Receiving Quality Status Confirming Request>

An operation outline of the optical transmission apparatus 20 when the communication unit 21 receives a quality status confirming request will be described with respect to FIG. 4 and FIG. 5. In a case where the communication unit 21 receives a quality status confirming request, the communication unit 21 transmits an acquisition request to the communication unit 31. The communication unit 21 receives measured values of a predetermined number acquired by the measurement unit 32 via the communication unit 31, and transmits the received measured values to the acquisition unit 22. In a case where the acquisition unit 22 acquires the measured values, the cumulative distribution estimation unit 23 generates a cumulative distribution for communication quality information on the basis of the measured values thus acquired. FIG. 4 illustrates a cumulative distribution generated by the cumulative distribution estimation unit 23. As illustrated in FIG. 4, a horizontal axis thereof is a value of a Q-value that is one example of the communication quality information, and a vertical axis thereof represents a cumulative probability. The cumulative distribution estimation unit 23 plots a relationship between the value of the Q-value as the communication quality information and the cumulative probability on a graph illustrated in FIG. 4 on the basis of the measured values thus acquired. Points illustrated in FIG. 4 are points plotted by the cumulative distribution estimation unit 23 and representing the relationship between the Q-value and the cumulative probability. The cumulative distribution estimation unit 23 generates a curved line L1 representing a first cumulative distribution function by finding an approximate curved line from the points plotted as the cumulative distribution using a least squares method or the like, for example. The cumulative distribution estimation unit 23 calculates an average value $Q_{ave}$ of the measured values thus acquired, and calculates a slope in a region where a change in the cumulative probability is steep such as a region where the cumulative probability becomes 0.1 to 0.9 from the first cumulative distribution function, for example.

Next, as illustrated in FIG. 5, the cumulative distribution estimation unit 23 determines a straight line L3 that passes through a point P1 at which a value of the Q-value whose cumulative probability is 0.5 becomes the calculated average value $Q_{ave}$ and has the calculated slope as a slope of the straight line. The cumulative distribution estimation unit 23 approximates, by the straight line L3, a second cumulative distribution function in a region where a change in the cumulative probability is steep on a curved line L2 that indicates the second cumulative distribution function based on measured values when the measured values more than the number of the measured values thus acquired are acquired.

A dotted line L2 is a curved line representing the second cumulative distribution function, and is a curved line indicating a cumulative distribution function in a case where the measured values more than the number of the measured values thus acquired are acquired. The cumulative distribution estimation unit 23 determines, as an approximate straight line, the region of the dotted line L2, that is, the straight line L3 where the change in the cumulative probability is steep, such as the region where the cumulative probability is 0.1 to 0.9, for example. Namely, the cumulative distribution estimation unit 23 estimates the second cumulative distribution function by approximating the curved line L2 indicating an unknown second cumulative distribution function by a known straight line L3. The communication quality determination unit 24 determines $Q_{wERR}$ on the straight line L3, which is a value of communication quality information at which the cumulative probability becomes a predetermined value, as a reference quality value.

In a case where the reference quality value $Q_{wERR}$ satisfies an FL (FER Limit) representing a required quality value, the control unit 25 changes a parameter so that the reference quality value $Q_{wERR}$ becomes lower. Further, in a case where the reference quality value $Q_{wERR}$ before the parameter is changed does not satisfy the required quality value FL, the control unit 25 changes the parameter so that the reference quality value $Q_{wERR}$ becomes higher.

<Operation Outline at Time of Parameter Adjusting request and Before Change of Parameter>

Next, in a case where the communication unit 21 receive a parameter adjusting request and the control unit 25 does not change a parameter, the optical transmission apparatus 20 executes an operation similar to the operation at the time of receiving the quality status confirming request. Namely, in a case where the parameter adjusting request is received from the communication unit 21 and the control unit 25 does not change the parameter, the optical transmission apparatus 20 executes the operation that has been described with reference to FIG. 4 and FIG. 5.

<Operation Outline at Time of Parameter Adjusting Request and Change in Dispersion Dissimilarity Parameter>

Next, in a case where the communication unit 21 receives a parameter adjusting request and the control unit 25 changes a dispersion dissimilarity parameter, the optical transmission apparatus 20 executes an operation similar to the operation at the time of receiving the quality status confirming request. Namely, in a case where the control unit 25 changes the dispersion dissimilarity parameter, the optical transmission apparatus 20 executes the operation that has been described with reference to FIG. 4 and FIG. 5.

<Operation Outline at Time of Parameter Adjusting Request and Change in Dispersion Similarity Parameter>

Next, an operation outline of the optical transmission apparatus 20 in a case where the communication unit 21 receives a parameter adjusting request and the control unit 25 changes a dispersion similarity parameter will be described with respect to FIG. 6.

First, it is assumed that the cumulative distribution estimation unit 23 calculates an average value $Q_{ave1}$ on the basis of measured values before a dispersion similarity parameter is changed and a slope of a first cumulative distribution function in a region where a change in a cumulative probability is steep is calculated. In this case, the cumulative distribution estimation unit 23 determines a straight line L31 that passes through a point P21 at which a value of a Q-value whose cumulative probability is 0.5 becomes the calculated average value $Q_{ave1}$ and has the calculated slope as a slope of a straight line. Then, the communication quality determination unit 24 determines a reference quality value $Q_{wERR1}$ using the straight line L31. Note that in FIG. 6, a curved line L21 represents a second cumulative distribution function based on the measured values before the dispersion similarity parameter is changed, and represents a second cumulative distribution function that the cumulative distribution estimation unit 23 approximates by the straight line L31.

Next, in a case where the control unit 25 changes the dispersion similarity parameter, the cumulative distribution estimation unit 23 calculates an average value of measured values acquired after the parameter is changed. Further, the cumulative distribution estimation unit 23 calculates a difference between the calculated average value $Q_{ave1}$ and the reference quality value $Q_{wERR1}$ as a margin value Margin before the dispersion similarity parameter is changed. The communication quality determination unit 24 determines a value obtained by subtracting the margin value Margin from an average value $Q_{ave2}$ calculated after the dispersion similarity parameter is changed as a reference quality value $Q_{wERR2}$ after the dispersion similarity parameter is changed. Note that, once the cumulative distribution estimation unit 23 determines the margin value Margin, the cumulative distribution estimation unit 23 can use the determined margin value Margin even in a case where the dispersion similarity parameter is changed multiple times. For that reason, the cumulative distribution estimation unit 23 may determine the margin value Margin only once.

Here, in a case where the dispersion similarity parameter is changed, the cumulative distribution estimation unit 23 can also determine a straight line L32 obtained by approximating the second cumulative distribution function as well as a case where the dispersion dissimilarity parameter is changed. However, in the dispersion similarity parameter, a dispersion of values of communication quality information is the same before and after the parameter is changed. Namely, a slope of the straight line L31 obtained by approximating the second cumulative distribution function before the parameter is changed is the same as a slope of the straight line L32 obtained by approximating the second cumulative distribution function after the parameter is changed. For that reason, in a case where the dispersion similarity parameter is changed, the cumulative distribution estimation unit 23 does not calculate the slope of the straight line L32 obtained by approximating the second cumulative distribution function after the parameter is changed, but calculates the margin value Margin. Then, the communication quality determination unit 24 determines a value obtained by subtracting the margin value Margin from the average value $Q_{ave2}$ calculated after the dispersion similarity parameter is changed as the reference quality value $Q_{wERR2}$ after the dispersion similarity parameter is changed. Thus, in a case where the dispersion similarity parameter is changed, the communication quality determination unit 24 can immediately determine the reference quality value $Q_{wERR2}$ by using the margin value representing a shift amount between the straight line L31 and the straight line L32, which are respectively approximate straight lines before and after the parameter is changed. Further, in a case where the dispersion similarity parameter is changed, the communication quality determination unit 24 can immediately determine the reference quality value $Q_{wERR2}$ only by means of the subtraction processing using the average value after the parameter is changed and the margin value without calculating the straight line L32 that is the approximate straight line after the parameter is changed. Therefore, the communication quality determination unit 24 reduce the amount of calculation as compared with the case where the dispersion dissimilarity parameter is changed.

Operation Example 1 (Operation Example at Time of Receiving Quality Status Confirming Request)

Figure 7:
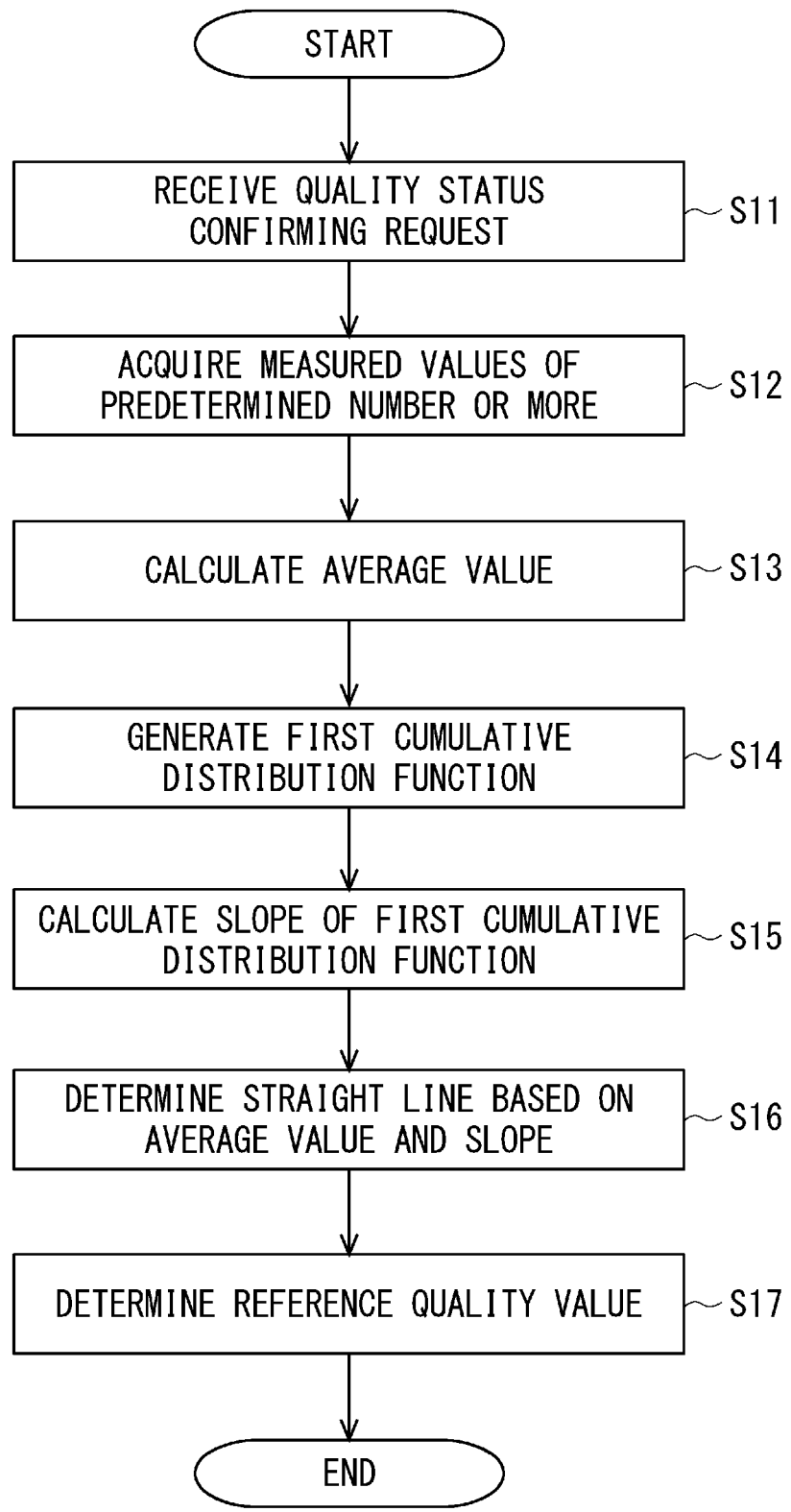
FIG. 7 is a flowchart illustrating an operation example of the optical transmission apparatus according to the second example embodiment.

Next, an operation example of the optical transmission apparatus 20 at the time of receiving a quality status confirming request will be described with reference to FIG. 7. FIG. 7 is a flowchart illustrating an operation example of the optical transmission apparatus 20 according to the second example embodiment.

The communication unit 21 receives a quality status confirming request (Step S11).

For example, the communication unit 21 receives the quality status confirming request from a network monitoring apparatus (not illustrated in the drawings). In a case where the quality status confirming request is received, the communication unit 21 transmits an acquisition request to the communication unit 31. The communication unit 31 of the optical transmission apparatus 30 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the optical transmission apparatus 20 via the communication unit 31.

The acquisition unit 22 acquires the measured values of the predetermined number or more (Step S12).

After transmitting the acquisition request, the communication unit 21 receives the measured values of the predetermined number or more acquired by the measurement unit 32 from the communication unit 31 via the optical communication path P2. The acquisition unit 22 acquires the measured values of the predetermined number or more obtained by measuring the communication quality information in the optical communication path P2.

The cumulative distribution estimation unit 23 calculates an average value of the measured values thus acquired (Step S13).

The cumulative distribution estimation unit 23 generates a first cumulative distribution function (Step S14).

The cumulative distribution estimation unit 23 generates a first cumulative distribution function indicating a cumulative distribution function of the communication quality information based on the measured values of the predetermined number or more thus acquired. The cumulative distribution estimation unit 23 generates a cumulative distribution having a horizontal axis representing a quality value of the communication quality information and a vertical axis representing a cumulative probability on the basis of the measured values thus acquired. The cumulative distribution estimation unit 23 generates the first cumulative distribution function by obtaining an approximate curved line using a least squares method for points plotted as the generated cumulative distribution, for example.

The cumulative distribution estimation unit 23 calculates a slope in a region where a change in the cumulative probability is steep in the first cumulative distribution function (Step S15).

The cumulative distribution estimation unit 23 calculates the slope in the region where the change in the cumulative probability is steep in the first cumulative distribution function. The cumulative distribution estimation unit 23 calculates the slope in the region where the change in the cumulative probability is steep, such as a region where the cumulative probability becomes 0.1 to 0.9, in the first cumulative distribution function, for example.

The cumulative distribution estimation unit 23 determines a straight line based on the calculated average value and the calculated slope (Step S16).

The cumulative distribution estimation unit 23 determines a straight line that passes through a point where the calculated average value is a value of the communication quality information at which the cumulative probability becomes 0.5 and has the calculated slope as a slope of the straight line. The cumulative distribution estimation unit 23 estimates a second cumulative distribution function by approximating a second cumulative distribution function in a region where a change in the cumulative probability is steep in the second cumulative distribution function by the determined straight line.

The communication quality determination unit 24 determines a reference quality value by using the determined straight line (Step S17).

The communication quality determination unit 24 considers that a reference quality value exists on the straight line determined at Step S15, and determines, as the reference quality value, a value of the communication quality information at the point on the straight line, in which a cumulative probability of the point becomes a predetermined value.

Operation Example 2 (Operation Example at Time of Receiving Parameter Adjusting Request)

Figure 8:
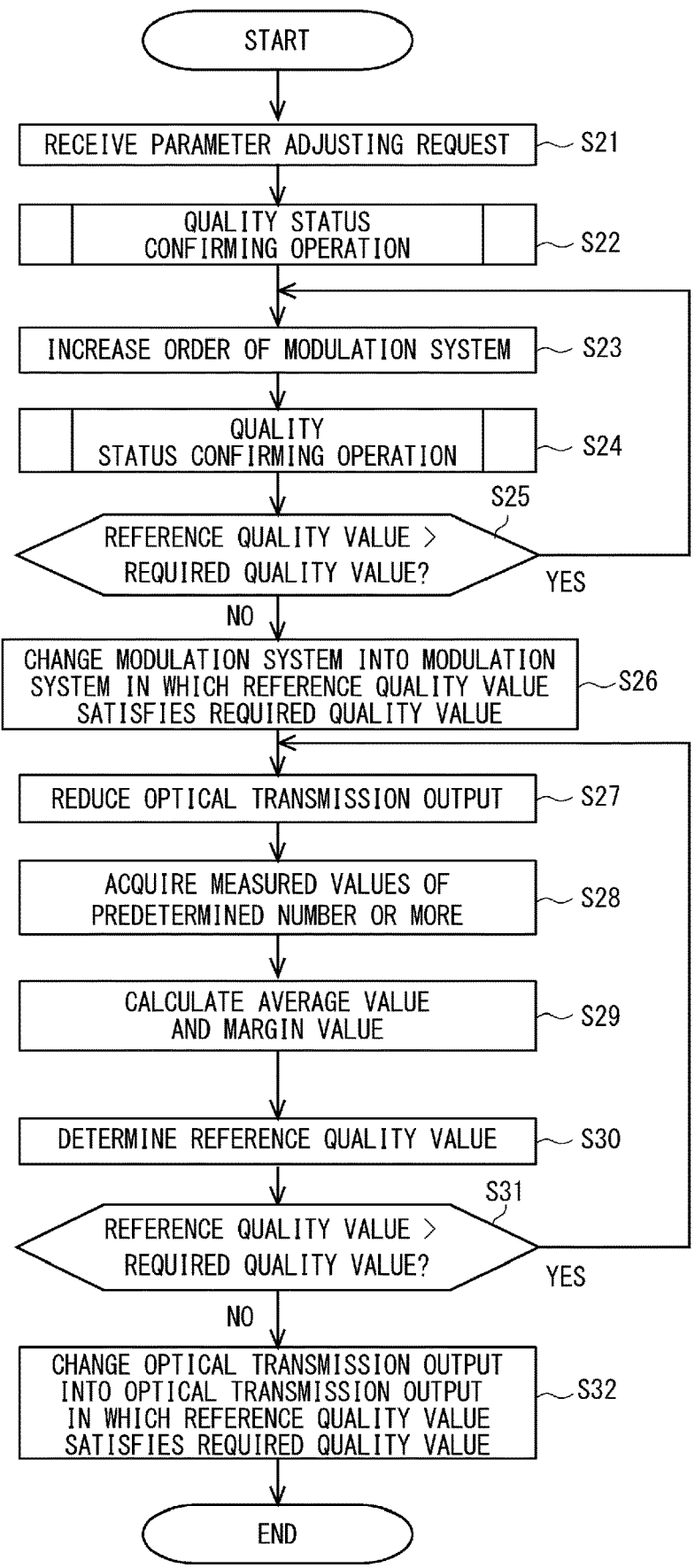
FIG. 8 is a flowchart illustrating an operation example of the optical transmission apparatus according to the second example embodiment.

Next, an operation example of the optical transmission apparatus 20 at the time of receiving a parameter adjusting request will be described with reference to FIG. 8. FIG. 8 is a flowchart illustrating an operation example of the optical transmission apparatus 20 according to the second example embodiment. Specifically, FIG. 8 is a flowchart illustrating an operation example when the optical transmission apparatus 20 receives a parameter adjusting request, determines a reference quality value before the parameter is changed, and then, changes a dispersion dissimilarity parameter and a dispersion similarity parameter.

Note that description of portions in an operation of FIG. 8 common to those in the operation of FIG. 7 will be omitted appropriately while referring to FIG. 7. It is assumed that a state before the operation example of FIG. 8 is executed is a state where a reference quality value satisfies a required quality value. Further, the description is made on the assumption that the dispersion dissimilarity parameter is a modulation system in the optical communication path P2 and the dispersion similarity parameter is optical transmission power in the optical communication path P2. However, it is an example, and the present disclosure is not limited to this. FIG. 8 illustrates the operation example in a case where two parameters are changed, but the number of parameters to be changed is not limited to two. It may be one, or may be three or more.

First, the communication unit 21 receives a parameter adjusting request (Step S21).

For example, the communication unit 21 receives a parameter adjusting request from a network monitoring apparatus (not illustrated in the drawings). In a case where the parameter adjusting request is received, the communication unit 21 transmits an acquisition request to the communication unit 31. The communication unit 31 of the optical transmission apparatus 30 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the optical transmission apparatus 20 via the communication unit 31.

The optical transmission apparatus 20 executes a quality status confirming operation (Step S22).

The quality status confirming operation is an operation at Steps S12 to S17 in the flowchart illustrated in FIG. 7. The acquisition unit 22 executes Step S12 illustrated in FIG. 7; the cumulative distribution estimation unit 23 executes Steps S13 to S16 illustrated in FIG. 7; and the communication quality determination unit 24 executes Step S17.

Next, the control unit 25 increases an order of a modulation system on the optical communication path P2 (Step S23). The order of the modulation system is a dispersion dissimilarity parameter.

In a case where the modulation system before the modulation system is changed is QPSK, the control unit 25 changes the modulation system into 8QAM. In a case where the modulation system before the modulation system is changed is 8QAM, the control unit 25 changes the modulation system into 16QAM. In a case where the modulation system before the modulation system is changed is 16QAM, the control unit 25 changes the modulation system into 32QAM. Namely, the control unit 25 executes a control of increasing the order of the modulation system by one, whereby the reference quality value is deteriorated, but communication capacity is increased. Note that, in a case where the modulation system before the modulation system is changed is 32QAM, the optical transmission apparatus 20 may skip Steps S24 and S25, and execute Step S26.

The optical transmission apparatus 20 executes a quality status confirming operation (Step S24).

The acquisition unit 22 executes Step S12 illustrated in FIG. 7; the cumulative distribution estimation unit 23 executes Steps S13 to S16 illustrated in FIG. 7; and the communication quality determination unit 24 executes Step S17.

The control unit 25 determines whether the reference quality value determined by the communication quality determination unit 24 is a value larger than a required quality value or not (Step S25).

In a case where it is determined that the reference quality value determined by the communication quality determination unit 24 is a value larger than the required quality value (YES at Step S25), the optical transmission apparatus 20 executes the operation after Step S23.

In a case where it is determined that the reference quality value determined by the communication quality determination unit 24 is not a value larger than the required quality value (NO at Step S25), the control unit 25 decreases the order of the modulation system by one, and changes the modulation system into a modulation system in which the reference quality value satisfies the required quality value (Step S26). Namely, the control unit 25 executes a control of decreasing the order of the modulation system by one, whereby the communication capacity is decreased, but the reference quality value is restored.

Next, the control unit 25 reduces optical transmission power in the optical communication path P2 (Step S27). The optical transmission power is a dispersion similarity parameter.

The control unit 25 executes a control of decreasing the optical transmission power by 1 mW, for example. Namely, the control unit 25 executes a control of lowering the optical transmission power, whereby the reference quality value is deteriorated, but the communication capacity is increased. In a case where the control unit 25 changes the optical transmission power, the communication unit 21 transmits an acquisition request to the communication unit 31. The communication unit 31 of the optical transmission apparatus 30 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the optical transmission apparatus 20 via the communication unit 31.

The acquisition unit 22 acquires the measured values of the predetermined number or more (Step S28).

After transmitting the acquisition request, the communication unit 21 receives the measured values of the predetermined number or more acquired by the measurement unit 32 from the communication unit 31 via the optical communication path P2. The acquisition unit 22 acquires the measured values of the predetermined number or more obtained by measuring the communication quality information in the optical communication path P2.

The cumulative distribution estimation unit 23 calculates an average value of the measured values thus acquired after the optical transmission power is changed, and calculates, as a margin value, a difference between an average value before the optical transmission power is changed and the reference quality value before the optical transmission power is changed (Step S29). Note that the margin value is not changed even in a case where the dispersion similarity parameter is changed. Therefore, the cumulative distribution estimation unit 23 may calculate the margin value only in a case where Step S29 is executed for the first time, and may not calculate the margin value when Step S29 is executed for the second and subsequent times.

The communication quality determination unit 24 determines, as a reference quality value after the optical transmission power is changed, a value obtained by subtracting the margin value from the average value of the measured values acquired after the optical transmission power is changed (Step S30).

The control unit 25 determines whether the reference quality value determined by the communication quality determination unit 24 is a value larger than a required quality value or not (Step S31).

In a case where it is determined that the reference quality value determined by the communication quality determination unit 24 is a value larger than the required quality value (YES at Step S31), the optical transmission apparatus 20 executes the operation after Step S27.

In a case where it is determined that the reference quality value determined by the communication quality determination unit 24 is not a value larger than the required quality value (NO at Step S31), the control unit 25 executes a control of increasing the optical transmission power by 1 mW, for example, to change the optical transmission power into optical transmission power in which the reference quality value satisfies the required quality value (Step S32). Namely, the control unit 25 executes a control of increasing the optical transmission power, whereby the communication capacity is decreased, but the reference quality value is restored. Then, the optical transmission apparatus 20 terminates the processing.

Operation Example 3 (Operation Example at Time of Receiving Parameter Adjusting Request)

Figure 9:
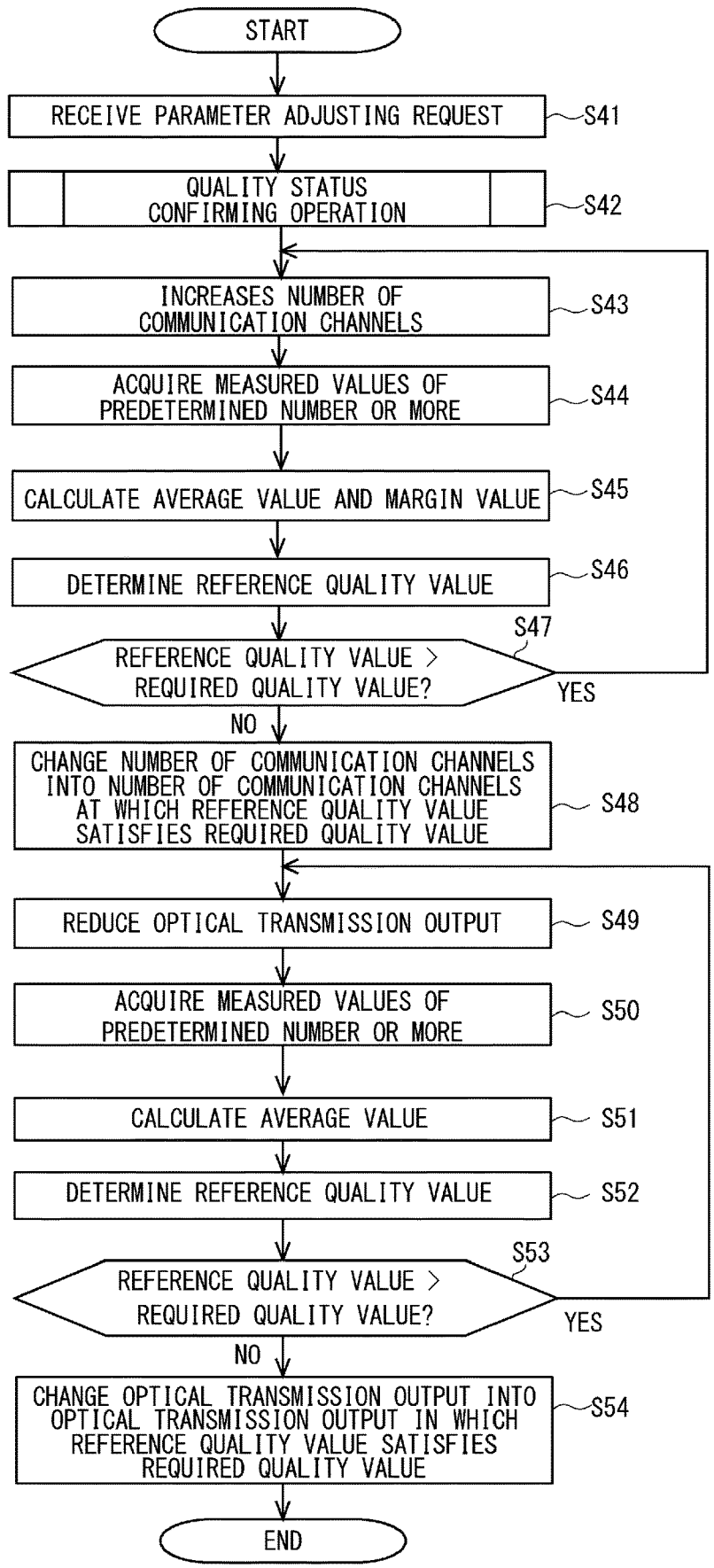
FIG. 9 is a flowchart illustrating an operation example of the optical transmission apparatus according to the second example embodiment.

Next, an operation example of the optical transmission apparatus 20 at the time of receiving a parameter adjusting request will be described with respect to FIG. 9. FIG. 9 is a flowchart illustrating an operation example of the optical transmission apparatus 20 according to the second example embodiment. Specifically, FIG. 9 is a flowchart illustrating an operation example when the optical transmission apparatus 20 receives a parameter adjusting request, determines a reference quality value before the parameter is changed, and then, changes two dispersion similarity parameters.

Note that description of portions in an operation of FIG. 9 common to those in the operation of FIG. 7 will be omitted appropriately while referring to FIG. 7. It is assumed that a state before the operation example of FIG. 9 is executed is a state where a reference quality value satisfies a required quality value. Further, the description is made on the assumption that a first dispersion similarity parameter is the number of communication channels in the optical communication path P2 and a second dispersion similarity parameter is optical transmission power in the optical communication path P2. However, it is an example, and the present disclosure is not limited to this. FIG. 9 illustrates the operation example in a case where two parameters are changed, but the number of parameters to be changed is not limited to two. It may be one, or may be three or more.

First, the communication unit 21 receives a parameter adjusting request (Step S41).

For example, the communication unit 21 receives a parameter adjusting request from a network monitoring apparatus (not illustrated in the drawings). In a case where the parameter adjusting request is received, the communication unit 21 transmits an acquisition request to the communication unit 31. The communication unit 31 of the optical transmission apparatus 30 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the optical transmission apparatus 20 via the communication unit 31.

The optical transmission apparatus 20 executes a quality status confirming operation (Step S42).

The quality status confirming operation is an operation at Steps S12 to S17 in the flowchart illustrated in FIG. 7. The acquisition unit 22 executes Step S12 illustrated in FIG. 7; the cumulative distribution estimation unit 23 executes Steps S13 to S16 illustrated in FIG. 7; and the communication quality determination unit 24 executes Step S17.

Next, the control unit 25 increases the number of communication channels in the optical communication path P2 (Step S43). The number of communication channels is a first dispersion similarity parameter.

The control unit 25 executes a control of increasing the number of communication channels in the optical communication path P2 by one. Namely, the control unit 25 executes a control of increasing the number of communication channels, whereby the reference quality value is deteriorated, but communication capacity is increased. In a case where the control unit 25 changes the number of communication channels, the communication unit 21 transmits an acquisition request to the communication unit 31. The communication unit 31 of the optical transmission apparatus 30 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the optical transmission apparatus 20 via the communication unit 31.

The acquisition unit 22 acquires measured values of a predetermined number or more (Step S44).

After transmitting the acquisition request, the communication unit 21 receives the measured values of the predetermined number or more acquired by the measurement unit 32 from the communication unit 31 via the optical communication path P2. The acquisition unit 22 acquires the measured values of the predetermined number or more measured for the communication quality information in the optical communication path P2.

The cumulative distribution estimation unit 23 calculates an average value of the measured values thus acquired after the number of communication channels is changed, and calculates, as a margin value, a difference between an average value before the number of communication channels is changed and the reference quality value before the number of communication channels is changed (Step S45). Note that the margin value is not changed even in a case where the dispersion similarity parameter is changed. Therefore, the cumulative distribution estimation unit 23 may calculate the margin value only in a case where Step S29 is executed for the first time, and does not calculate the margin value when Step S29 is executed for the second and subsequent times.

The communication quality determination unit 24 determines, as a reference quality value after the number of communication channels is changed, a value obtained by subtracting the margin value from the average value of the measured values acquired after the number of communication channels is changed (Step S46).

The control unit 25 determines whether the reference quality value determined by the communication quality determination unit 24 is a value larger than a required quality value or not (Step S47).

In a case where it is determined that the reference quality value determined by the communication quality determination unit 24 is the value larger than the required quality value (YES at Step S47), the optical transmission apparatus 20 executes the operation after Step S43.

In a case where it is determined that the reference quality value determined by the communication quality determination unit 24 is not the value larger than the required quality value (NO at Step S47), the control unit 25 executes a control of decreasing the number of communication channels by one to change the number of communication channels into the number of communication channels at which the reference quality value satisfies the required quality value (Step S48). Namely, the control unit 25 executes a control of decreasing the number of communication channels by one, whereby the communication capacity is decreased, but the reference quality value is restored.

Next, the control unit 25 reduces optical transmission power in the optical communication path P2 (Step S49). The optical transmission power is a second dispersion similarity parameter.

The control unit 25 executes a control of decreasing the optical transmission power by 1 mW, for example. Namely, the control unit 25 executes a control of lowering the optical transmission power, whereby the reference quality value is deteriorated, but the communication capacity is increased. In a case where the control unit 25 changes the optical transmission power, the communication unit 21 transmits an acquisition request to the communication unit 31. The communication unit 31 of the optical transmission apparatus 30 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the optical transmission apparatus 20 via the communication unit 31.

The acquisition unit 22 acquires measured values of a predetermined number or more (Step S50).

After transmitting the acquisition request, the communication unit 21 receives the measured values of the predetermined number or more acquired by the measurement unit 32 from the communication unit 31 via the optical communication path P2. The acquisition unit 22 acquires the measured values of the predetermined number or more obtained by measuring the communication quality information in the optical communication path P2.

The cumulative distribution estimation unit 23 calculates an average value of the measured value acquired after the optical transmission power is changed (Step S51). Note that, since the cumulative distribution estimation unit 23 calculates the margin value at timing when Step S45 is first executed, the cumulative distribution estimation unit 23 does not calculate the margin value at Step S51.

The communication quality determination unit 24 determines as a reference quality value after the optical transmission power is changed, a value obtained by subtracting the margin value from the average value of the measured values acquired after the optical transmission power is changed (Step S52).

The control unit 25 determines whether the reference quality value determined by the communication quality determination unit 24 is a value larger than the required quality value or not (Step S53).

In a case where it is determined that the reference quality value determined by the communication quality determination unit 24 is the value larger than the required quality value (YES at Step S53), the optical transmission apparatus 20 executes the operation after Step S49.

In a case where it is determined that the reference quality value determined by the communication quality determination unit 24 is not the value larger than the required quality value (NO at Step S53), the control unit 25 executes a control of increasing the optical transmission power by 1 mW, for example, to change the optical transmission power into optical transmission power in which the reference quality value satisfies the required quality value (Step S54). Namely, the control unit 25 executes a control of increasing the optical transmission power, whereby the communication capacity is decreased, but the reference quality value is restored. Then, the optical transmission apparatus 20 terminates the processing.

As described above, as well as the first example embodiment, the optical transmission apparatus 20 can determine the reference quality value when the measured values more than the number of measured values thus actually measured are acquired on the basis of the measured values of the communication quality information. For that reason, the communication carrier can determine the reference quality value when a large number of measured values is acquired, without acquiring a large number of measured values by using the optical transmission apparatus 20. In other words, by using the optical transmission apparatus 20, the communication carrier can determine the reference quality value of the measured values, which is assumed to be acquired for the total measured time longer than the total measured time thus actually measured, on the basis of the measured values thus acquired for the shorter total measured time. Therefore, according to the optical transmission apparatus 20 of the second example embodiment, the communication carrier can easily grasp the communication quality status.

Further, the control unit 25 uses the determined reference quality value based on the measured values of the communication quality information to control the parameters regarding the communication settings for the optical communication path P2 so that the reference quality value satisfies the required quality value. The cumulative distribution estimation unit 23 and the communication quality determination unit 24 can determine the reference quality value when a large number of measured values is acquired without acquiring a large number of measured values, and the control unit 25 can control, by using the determined reference quality value, so that the parameter regarding the communication settings becomes an optimal value. Namely, by using the optical transmission apparatus 20, the communication carrier can determine the optimal parameter value without acquiring a large number of measured values. Therefore, according to the optical transmission apparatus 20 of the second example embodiment, the communication carrier can immediately determine the optimal parameter value.

Moreover, in a case where the control unit 25 changes the dispersion similarity parameter, the cumulative distribution estimation unit 23 calculates the average value of the measured values thus acquired after the parameter is changed and the margin value. Then, the communication quality determination unit 24 can determine the reference quality value after the dispersion similarity parameter is changed on the basis of the calculated average value and the margin value. In other words, the cumulative distribution estimation unit 23 can determine the reference quality value after the dispersion similarity parameter is changed without approximating the second cumulative distribution function by the straight line based on the average value of the measured values thus acquired and the slope in the first cumulative distribution function. Therefore, according to the optical transmission apparatus 20 of the second example embodiment, in a case where the dispersion similarity parameter is changed, it is possible to grasp the communication quality status immediately and easily.

Modification Example

In a case where a dispersion similarity parameter is changed, a cumulative distribution estimation unit 23 may calculate a difference between a first average value indicating an average value of measured values acquired after the parameter is changed and a second average value indicating an average value measured values acquired before the parameter is changed without calculating a margin value. Then, a communication quality determination unit 24 may determine a reference quality value after the dispersion similarity parameter is changed on the basis of a first reference quality value indicating a reference quality value before the dispersion similarity parameter is changed and the difference described above. In a case where the first average value is larger than the second average value, the communication quality determination unit 24 may determine a value obtained by adding the difference described above to the first reference quality value as a reference quality value after the dispersion similarity parameter is changed. Further, in a case where the first average value is smaller than the second average value, the communication quality determination unit 24 may determine a value obtained by subtracting the difference described above from the first reference quality value as a reference quality value after the dispersion similarity parameter is changed. Thus, even though the second example embodiment is modified, it is possible to obtain effects similar to those according to the second example embodiment.

Third Example Embodiment

Subsequently, a third example embodiment will be described. The third example embodiment is an example embodiment in which a network monitoring apparatus executes the processes executed by the optical transmission apparatus 20 according to the second example embodiment.
<Configuration Example of Optical Communication System>

Figure 10:
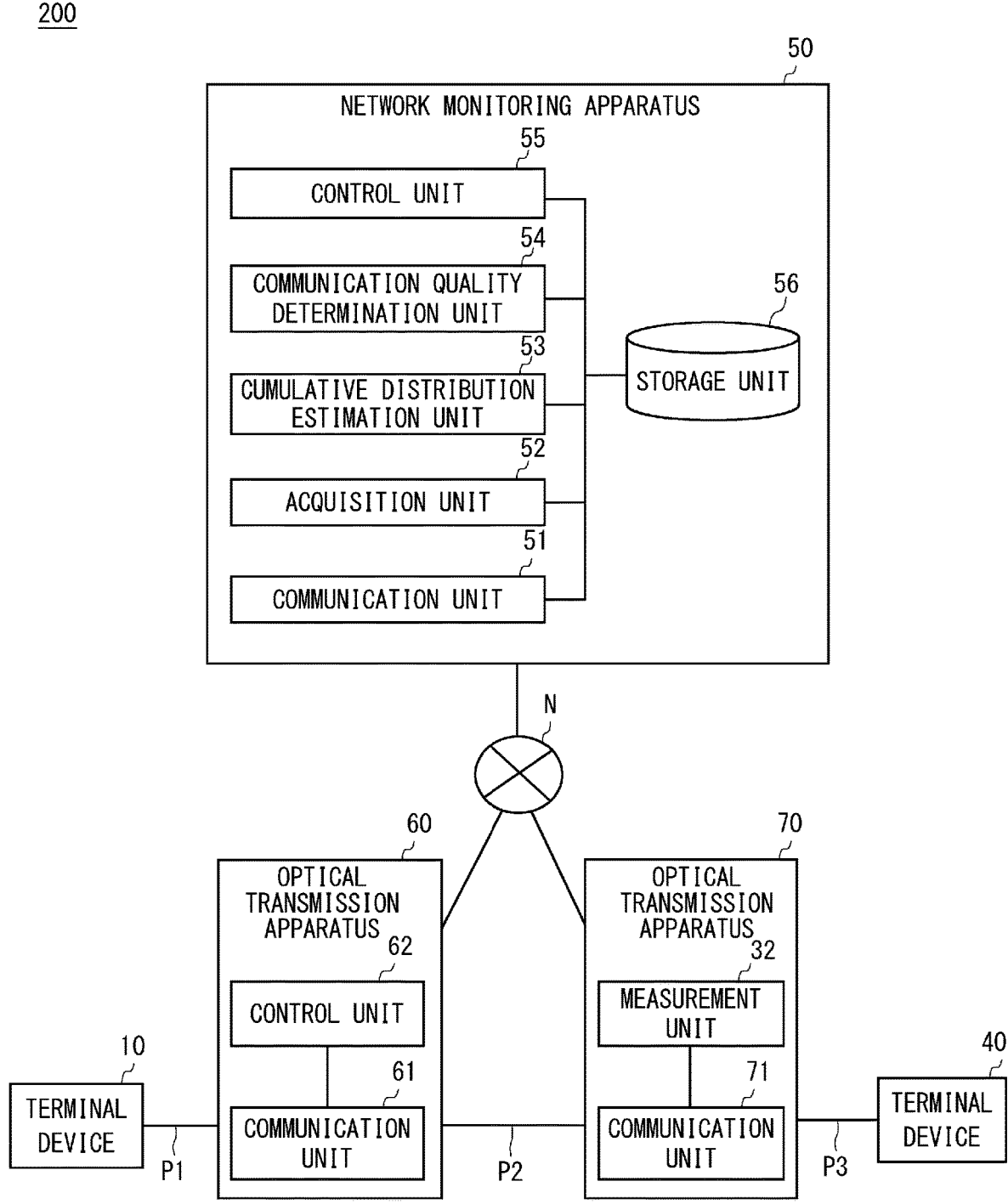
FIG. 10 is a view illustrating a configuration example of an optical communication system according to a third example embodiment.

A configuration example of an optical communication system 200 according to the third example embodiment will be described with reference to FIG. 10. FIG. 10 is a view illustrating the configuration example of the optical communication system 200 according to the third example embodiment. The optical communication system 200 includes terminal devices 10 and 40, a network monitoring apparatus 50, and optical transmission apparatuses 60 and 70.

The optical communication system 200 is configured so that the network monitoring apparatus 50 is added to the optical communication system 100 according to the second example embodiment. Further, the optical communication system 200 is configured so that the optical transmission apparatuses 20 and 30 in the optical communication system 100 according to the second example embodiment are respectively replaced by the optical transmission apparatuses 60 and 70. Note that, since configurations of the terminal devices 10 and 40 are basically similar to those according to the second example embodiment, explanation thereof will be omitted appropriately.

The network monitoring apparatus 50 is an apparatus configured to monitor the entire network of the optical communication system 200. The network monitoring apparatus 50 may be called an NMS (Network Management System). The network monitoring apparatus 50 is connected to each of the optical transmission apparatuses 60 and 70 via a network N to communicate with the optical transmission apparatuses 60 and 70. The network monitoring apparatus 50 monitors the optical transmission apparatuses 60 and 70, and controls the optical transmission apparatuses 60 and 70 via the network N.
<Configuration Example of Network Monitoring Apparatus>

Next, a configuration example of the network monitoring apparatus 50 will be described. The network monitoring apparatus 50 includes a communication unit 51, an acquisition unit 52, a cumulative distribution estimation unit 53, a communication quality determination unit 54, a control unit 55, and a storage unit 56. The acquisition unit 52, the cumulative distribution estimation unit 53, the communication quality determination unit 54, the control unit 55, and the storage unit 56 basically have configurations similar to those of the acquisition unit 22, the cumulative distribution estimation unit 23, the communication quality determination unit 24, the control unit 25, and the storage unit 56 according to the second example embodiment, respectively. For that reason, description of configuration examples of the acquisition unit 52, the cumulative distribution estimation unit 53, the communication quality determination unit 54, the control unit 55, and the storage unit 56 similar to those according to the second example embodiment will be omitted appropriately.

The communication unit 51 is configured to receive a quality status confirming request and a parameter adjusting request. For example, the communication unit 51 is configured to include an input device such as a keyboard, a mouse, or a touch panel, and receives (or inputs) the quality status confirming request and the parameter adjusting request, which is inputted by an operator who maintains and manages an optical communication path P2 by using the input device. The communication unit 51 transmits the quality status confirming request and the parameter adjusting request to the cumulative distribution estimation unit 53 and the communication quality determination unit 54. Further, the communication unit 51 transmits the parameter adjusting request to the control unit 55.

When the quality status confirming request is received, the communication unit 51 transmits an acquisition request to a communication unit 71 of the optical transmission apparatus 70 via the network N. When the parameter adjusting request is received, the communication unit 51 transmits an acquisition request to the communication unit 71 via the network N. Further, in a case where the communication unit 51 receives the parameter adjusting request, the control unit 55 changes a parameter in light of a communication quality status in the optical communication path P2. The communication unit 51 transmits an acquisition request to the communication unit 71 via the network N each time the control unit 55 changes the parameter.

After transmitting the acquisition request, the communication unit 51 receives measured values of a predetermined number or more acquired by a measurement unit 32 from the communication unit 71 via the network N. The communication unit 51 outputs the measured values of the predetermined number or more thus received to the acquisition unit 52.

The acquisition unit 52 acquires the measured values of the predetermined number or more measured for communication quality information in the optical communication path P2 from the measurement unit 32 via the communication units 51 and 71.

The cumulative distribution estimation unit 53 has a configuration similar to that of the cumulative distribution estimation unit 23 according to the second example embodiment, and executes the processing to be executed by the cumulative distribution estimation unit 23 according to the second example embodiment.

The communication quality determination unit 54 has a configuration similar to that of the communication quality determination unit 24 according to the second example embodiment, and executes the processing to be executed by the communication quality determination unit 24 according to the second example embodiment.

The control unit 55 basically has a configuration similar to that of the control unit 25 according to the second example embodiment. In a case where the parameter adjusting request is received, the control unit 55 changes a parameter related to communication settings for the optical communication path P2 via a control unit 62 of the optical transmission apparatus 60. The control unit 55 transmits a parameter name to be changed and a parameter value after change to the control unit 62 via the communication units 51 and 61 to cause the control unit 62 to execute changing the parameter, thereby changing the parameter. The control unit 55 changes the parameter so that the reference quality value after the parameter is changed satisfies a required quality value.

The storage unit 56 has a configuration similar to that of the storage unit 26 according to the second example embodiment, and executes the processing to be executed by the storage unit 26 according to the second example embodiment.

<Configuration Example of Optical Transmission Apparatus>

Next, a configuration example of the optical transmission apparatus 60 will be described. The optical transmission apparatus 60 includes a communication unit 61 and a control unit 62.

The communication unit 61 basically has a configuration similar to that of the communication unit 21 according to the second example embodiment. The communication unit 61 executes communication with the terminal device 10, and executes communication with the optical transmission apparatus 70. The communication unit 61 receives an optical communication signal from the optical transmission apparatus 70 via the optical communication path P2, and restores a data unit on the basis of a bit string contained in the optical communication signal. The communication unit 61 extracts a communication frame from the data unit, and transmits it to the terminal device 10 via the communication path P1. The communication unit 61 receives the communication frame from the terminal device 10 via the communication path P1. The communication unit 61 stores the received communication frame in the data unit, and converts the data unit into an optical communication signal. The communication unit 61 transmits the optical communication signal to the optical transmission apparatus 70 via the optical communication path P2.

The communication unit 61 receives a parameter name changed by the control unit 55 and a parameter value after change from the control unit 55 via the communication unit 51, and transmits the parameter name and the parameter value after change to the control unit 62.

The control unit 62 changes a parameter for the optical communication path P2 related to communication settings in accordance with a control of the control unit 55. The control unit 62 receives the parameter name changed by the control unit 55 and the parameter value after change via the communication unit 61. The control unit 62 changes a parameter value of the received parameter name into the parameter value after change.

The optical transmission apparatus 70 includes the communication unit 71 and the measurement unit 32. Note that, since a configuration of the measurement unit 32 is similar to that according to the second example embodiment, description thereof will be omitted.

The communication unit 71 basically has a configuration similar to that of the communication unit 31 according to the second example embodiment. The communication unit 71 executes communication with the terminal device 40, and executes communication with the optical transmission apparatus 60. The communication unit 71 receives an optical communication signal from the optical transmission apparatus 60 via the optical communication path P2, and restores a data unit on the basis of a bit string contained in the optical communication signal. The communication unit 71 extracts a communication frame from the data unit, and transmits it to the terminal device 40 via the communication path P3.

The communication unit 71 receives a communication frame from the terminal device 40 via the communication path P3. The communication unit 71 stores the received communication frame in the data unit, and converts the data unit into an optical communication signal. The communication unit 71 transmits the optical communication signal to the optical transmission apparatus 60 via the optical communication path P2.

The communication unit 71 receives the acquisition request from the network monitoring apparatus 50 via the network N, and notifies (or transmits to) the measurement unit 32 that the acquisition request is received. The communication unit 71 transmits a plurality of measured value acquired by the measurement unit 32 to the network monitoring apparatus 50 via the network N.

<Operation Example of Network Monitoring Apparatus>

Next, an operation example of the network monitoring apparatus 50 will be described. The network monitoring apparatus 50 executes an operation similar to the operation executed by the optical transmission apparatus 20 according to the second example embodiment. For that reason, an operation example of the network monitoring apparatus 50 will be described with reference to FIG. 7 to FIG. 9 while appropriately omitting the description.

Operation Example 1 (Operation Example at Time of Receiving Quality Status Confirming Request)

Next, an operation example of the network monitoring apparatus 50 when the quality status confirming request is received (or inputted) will be described with reference to FIG. 7.

The communication unit 51 receives a quality status confirming request (Step S11).

The communication unit 51 receives (or inputs) a quality status confirming request, which is inputted by an operator who maintains and manages the optical communication path P2 by using an input device. In a case where the quality status confirming request is received, the communication unit 51 transmits an acquisition request to the communication unit 71 via the network N. The communication unit 71 of the optical transmission apparatus 70 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the network monitoring apparatus 50 via the communication unit 71.

The acquisition unit 52 acquires the measured values of the predetermined number or more (Step S12).

The cumulative distribution estimation unit 53 calculates an average value of the measured values thus acquired (Step S13), and generates a first cumulative distribution function (Step S14).

The cumulative distribution estimation unit 53 calculates a slope in a region where a change in the cumulative probability is steep in the first cumulative distribution function (Step S15), and determines a straight line based on the calculated average value and the calculated slope (Step S16).

The communication quality determination unit 54 determines a reference quality value by using the determined straight line (Step S17).

Operation Example 2 (Operation Example at Time of Receiving Parameter Adjusting Request)

Next, an operation example of the network monitoring apparatus 50 when a parameter adjusting request is received will be described with reference to FIG. 8. FIG. 8 is a flowchart illustrating an operation example when the network monitoring apparatus 50 receives a parameter adjusting request, determines a reference quality value before the parameter is changed, and then, changes a dispersion dissimilarity parameter and a dispersion similarity parameter. Description of portions in an operation of FIG. 8 common to those in the operation of FIG. 7 will be omitted appropriately while referring to FIG. 7. Also, in the present example embodiment, the description is made on the assumption that: a state before the operation example of FIG. 8 is executed is a state where a reference quality value satisfies a required quality value; the dispersion dissimilarity parameter is a modulation system; and the dispersion similarity parameter is optical transmission power. Note that in the present example embodiment, the number of parameters to be changed is not limited to two; and it may be one, or may be three or more.

First, the communication unit 51 receives a parameter adjusting request (Step S21).

The communication unit 51 receives (or inputs) a parameter adjusting request, which is inputted by an operator who maintains and manages the optical communication path P2 by using an input device. In a case where the parameter adjusting request is received, the communication unit 51 transmits an acquisition request to the communication unit 71 via the network N. The communication unit 71 of the optical transmission apparatus 70 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the network monitoring apparatus 50 via the communication unit 71.

The network monitoring apparatus 50 executes a quality status confirming operation (Step S22).

The acquisition unit 52 executes Step S12 illustrated in FIG. 7; the cumulative distribution estimation unit 53 executes Steps S13 to S16 illustrated in FIG. 7; and the communication quality determination unit 54 executes Step S17.

Next, the control unit 55 increases an order of a modulation system on the optical communication path P2 (Step S23). The order of the modulation system is a dispersion dissimilarity parameter.

In a case where the modulation system before the modulation system is changed is QPSK, the control unit 55 changes the modulation system into 8QAM. In a case where the modulation system before the modulation system is changed is 8QAM, the control unit 55 changes the modulation system into 16QAM. In a case where the modulation system before the modulation system is changed is 16QAM, the control unit 55 changes the modulation system into 32QAM. The control unit 55 transmits the fact that the parameter name to be changed is the modulation system and the modulation system after change that is the parameter value after change to the control unit 62 via the communication units 51 and 61, and changes the modulation system by causing the control unit 62 to execute changing the modulation system. The control unit 62 receives the fact that the parameter name to be changed is the modulation system and the modulation system after change that is the parameter value after change, and changes the modulation system into the modulation system after change. Note that, in a case where the modulation system before the modulation system is changed is 32QAM, the network monitoring apparatus 50 may skip Steps S24 and S25, and execute Step S26.

The network monitoring apparatus 50 executes a quality status confirming operation (Step S24).

The acquisition unit 52 executes Step S12 illustrated in FIG. 7; the cumulative distribution estimation unit 53 executes Steps S13 to S16 illustrated in FIG. 7; and the communication quality determination unit 54 executes Step S17.

The control unit 55 determines whether the reference quality value determined by the communication quality determination unit 54 is a value larger than a required quality value or not (Step S25).

In a case where it is determined that the reference quality value determined by the communication quality determination unit 54 is a value larger than the required quality value (YES at Step S25), the network monitoring apparatus 50 executes the operation after Step S23.

In a case where it is determined that the reference quality value determined by the communication quality determination unit 54 is not a value larger than the required quality value (NO at Step S25), the control unit 55 decreases the order of the modulation system by one, and changes the modulation system into a modulation system in which the reference quality value satisfies the required quality value (Step S26). The control unit 55 transmits the fact that the parameter name to be changed is the modulation system and the modulation system after change that is the parameter value after change to the control unit 62 via the communication units 51 and 61, and changes the modulation system by causing the control unit 62 to execute changing the modulation system. The control unit 62 receives the fact that the parameter name to be changed is the modulation system and the modulation system after change that is the parameter value after change, and changes the modulation system into the modulation system after change.

Next, the control unit 55 reduces optical transmission power in the optical communication path P2 (Step S27). The optical transmission power is a dispersion similarity parameter.

The control unit 55 executes a control of decreasing the optical transmission power by 1 mW, for example. The control unit 55 transmits the fact that the parameter name to be changed is the optical transmission power and a value of the optical transmission power after change that is the parameter value after change to the control unit 62 via the communication units 51 and 61, and causes the control unit 62 to execute changing the optical transmission power, thereby changing the optical transmission power. The control unit 62 receives the fact that the parameter name to be changed is the optical transmission power and the value of the optical transmission power after change, and changes the value of the optical transmission power to the value of the optical transmission power after change. In a case where the control unit 55 change the optical transmission power, the communication unit 51 transmits an acquisition request to the communication unit 71. The communication unit 71 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the network monitoring apparatus 50 via the communication unit 71.

The acquisition unit 52 acquires the measured values of the predetermined number or more (Step S28).

The cumulative distribution estimation unit 53 calculates an average value of measured values acquired after the optical transmission power is changed, and calculates, as a margin value, a difference between an average value before the optical transmission power is changed and the reference quality value before the optical transmission power is changed (Step S29). Note that the cumulative distribution estimation unit 53 may calculate the margin value only in a case where Step S29 is executed for the first time, and may not calculate the margin value in a case where Step S29 is executed for the second and subsequent times.

The communication quality determination unit 54 determines, as a reference quality value after the optical transmission power is changed, a value obtained by subtracting the margin value from the average value of the measured values acquired after the optical transmission power is changed (Step S30).

The control unit 55 determines whether the reference quality value determined by the communication quality determination unit 54 is a value larger than the required quality value or not (Step S31).

In a case where it is determined that the reference quality value determined by the communication quality determination unit 54 is the value larger than the required quality value (YES at Step S31), the network monitoring apparatus 50 executes the operation after Step S27.

In a case where it is determined that the reference quality value determined by the communication quality determination unit 54 is not the value larger than the required quality value (NO at Step S31), the control unit 55 executes a control of increasing the optical transmission power by 1 mW, for example, to change into the optical transmission power at which the reference quality value satisfies the required quality value (Step S32). The control unit 55 transmits the fact that the parameter name to be changed is the optical transmission power and the value of the optical transmission power after change to the control unit 62 via the communication units 51 and 61, and causes the control unit 62 to execute changing the optical transmission power, thereby changing the optical transmission power. The control unit 62 receives the fact that the parameter name to be changed is the optical transmission power and the value of the optical transmission power after change, and changes the value of the optical transmission power to the value of the optical transmission power after change. Then, the network monitoring apparatus 50 terminates the processing.

Operation Example 3 (Operation Example at Time of Receiving Parameter Adjusting Request)

Next, an operation example of the network monitoring apparatus 50 when a parameter adjusting request is received will be described with reference to FIG. 9. FIG. 9 is a flowchart illustrating an operation example when the network monitoring apparatus 50 receives a parameter adjusting request, determines a reference quality value before a parameter is changed, and then, changes two dispersion similarity parameters. Description of portions in an operation of FIG. 9 common to those in the operation of FIG. 7 will be omitted appropriately while referring to FIG. 7. It is assumed that a state before the operation example of FIG. 9 is executed is executed is a state where a reference quality value satisfies a required quality value. Further, the description is made on the assumption that a first dispersion similarity parameter is the number of communication channels in the optical communication path P2 and a second dispersion similarity parameter is optical transmission power in the optical communication path P2. FIG. 9 is the operation example when the two parameters are changed. However, the number of parameters to be changed is not limited to two. It may be one, or may be three or more.

First, the communication unit 51 receives a parameter adjusting request (Step S41).

The communication unit 51 receives (or inputs) a parameter adjusting request, which is inputted by an operator who maintains and manages the optical communication path P2 by using an input device. In a case where the parameter adjusting request is received, the communication unit 51 transmits an acquisition request to the communication unit 71 via the network N. The communication unit 71 of the optical transmission apparatus 70 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the network monitoring apparatus 50 via the communication unit 71.

The network monitoring apparatus 50 executes a quality status confirming operation (Step S42).

The acquisition unit 52 executes Step S12 illustrated in FIG. 7; the cumulative distribution estimation unit 53 executes Step S13 to S16 illustrated in FIG. 7; and the communication quality determination unit 54 executes Step S17.

Next, the control unit 55 increases the number of communication channels in the optical communication path P2, which is the first dispersion similarity parameter (Step S43).

The control unit 55 executes a control of increasing the number of communication channels in the optical communication path P2 by one. The control unit 55 transmits the fact that a parameter name to be changed is the number of communication channels and the number of communication channels after change that is a parameter value after change to the control unit 62 via the communication units 51 and 61, and causes the control unit 62 to execute changing the number of communication channels, thereby changing the number of communication channels. The control unit 62 receives the fact that the parameter name to be changed is the number of communication channels and the number of communication channels after change, and changes the number of communication channels to the number of communication channels after change. In a case where the control unit 55 changes the number of communication channels, the communication unit 51 transmits an acquisition request to the communication unit 71 via the network N. The communication unit 71 of the optical transmission apparatus 70 receive the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the network monitoring apparatus 50 via the communication unit 71.

The acquisition unit 52 acquires the measured values of the predetermined number or more (Step S44).

The cumulative distribution estimation unit 53 calculates an average value of the measured values acquired after the number of communication channels is changed, and calculates, as a margin value, a difference between an average value before the number of communication channels is changed and the reference quality value before the number of communication channels is changed (Step S45). Note that the cumulative distribution estimation unit 53 calculates the margin value only in a case where Step S45 is executed for the first time, and may not calculate the margin value in a case where Step S45 is executed for the second and subsequent times.

The communication quality determination unit 54 determines a value obtained by subtracting the margin value from the average value of the measured values acquired after the number of communication channels is changed as a reference quality value after the number of communication channels is changed (Step S46).

The control unit 55 determines whether the reference quality value determined by the communication quality determination unit 54 is a value larger than the required quality value or not (Step S47).

In a case where it is determined that the reference quality value determined by the communication quality determination unit 54 is the value larger than the required quality value (YES at Step S47), the network monitoring apparatus 50 executes the operation after Step S43.

In a case where it is determined that the reference quality value determined by the communication quality determination unit 54 is not the value larger than the required quality value (NO at Step S47), the control unit 55 executes a control of decreasing the number of communication channels by one to change the number of communication channels into the number of communication channels at which the reference quality value satisfies the required quality value (Step S48).

The control unit 55 transmits the fact that the parameter name to be changed is the number of communication channels and the number of communication channels after change to the control unit 62 via the communication units 51 and 61, and causes the control unit 62 to execute changing the number of communication channels, thereby changing the number of communication channels. The control unit 62 receives the fact that the parameter name to be changed is the number of communication channels and the number of communication channels after change, and changes the number of communication channels to the number of communication channels after change.

The control unit 55 reduces optical transmission power in the optical communication path P2 (Step S49). The optical transmission power is the second dispersion similarity parameter.

The control unit 55 executes a control of decreasing the optical transmission power by 1 mW, for example. The control unit 55 transmits the fact that the parameter name to be changes is the number of communication channels and the number of communication channels after change that is the parameter value after change to the control unit 62 via the communication units 51 and 61, and causes the control unit 62 to execute changing the number of communication channels, thereby changing the number of communication channels. The control unit 62 receives the fact that the parameter name to be changed is the number of communication channels and the number of communication channels after change, and changes the number of communication channels to the number of communication channels after change. In a case where the control unit 55 changes the optical transmission power, the communication unit 51 transmits an acquisition request to the communication unit 31 via the network N. The communication unit 71 receives the acquisition request, and transmits the acquisition request to the measurement unit 32. The measurement unit 32 measures communication quality information in the optical communication path P2 to acquire measured values of a predetermined number or more. The measurement unit 32 transmits the measured values of the predetermined number or more thus acquired to the network monitoring apparatus 50 via the communication unit 71.

The acquisition unit 52 acquires the measured values of the predetermined number or more (Step S50).

The cumulative distribution estimation unit 53 calculates an average value of the measured values acquired after the optical transmission power is changed (Step S51).

The communication quality determination unit 54 determines, as a reference quality value after the optical transmission power is changed, a value obtained by subtracting a margin value from the average value of the measured values acquired after the optical transmission power is changed (Step S52).

The control unit 55 determines whether the reference quality value determined by the communication quality determination unit 54 is a value larger than a required quality value or not (Step S53).

In a case where it is determined that the reference quality value determined by the communication quality determination unit 54 is the value larger than the required quality value (YES at Step S53), the network monitoring apparatus 50 executes the operation after Step S49.

In a case where it is determined that the reference quality value determined by the communication quality determination unit 54 is not the value larger than the required quality value (NO at Step S53), the control unit 55 executes a control of increasing the optical transmission power by 1 mW, for example, to change the optical transmission power into optical transmission power in which the reference quality value satisfies the required quality value (Step S54). The control unit 55 transmits the fact that the parameter name to be changed is the optical transmission power and the value of the optical transmission power after change to the control unit 62 via the communication units 51 and 61, and causes the control unit 62 to execute changing the optical transmission power, thereby changing the optical transmission power. The control unit 62 receives the fact that the parameter name to be changed is the optical transmission power and the value of the optical transmission power after change, and changes a value of the optical transmission power to a value of the optical transmission power after change. Then, the network monitoring apparatus 50 terminates the processing.

As described above, even though the network monitoring apparatus 50 includes the configuration included by the optical transmission apparatus 20 according to the second example embodiment and executes the operation executed by the optical transmission apparatus 20 according to the second example embodiment, it is possible to obtain the similar effects to those according to the second example embodiment.

Another Example Embodiment

Figure 11:
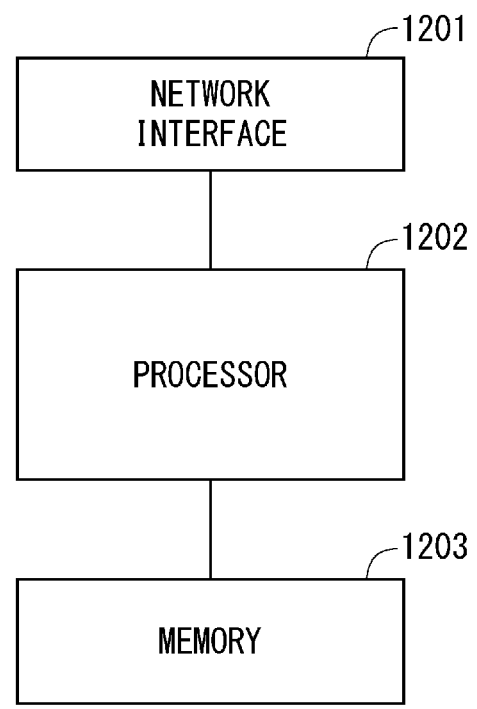

FIG. 11 is a block diagram illustrating a hardware configuration example of each of the communication apparatus 1, the optical transmission apparatuses 20, 30, 60, 70, and the network monitoring apparatus 50 (hereinafter, referred to as "the communication apparatus 1 and the like"), which have been described in the example embodiments described above. Referring to FIG. 11, the communication apparatus 1 and the like includes a network interface 1201, a processor 1202, and a memory 1203. The network interface 1201 is used for communicating with the other communication apparatus included in an optical communication system such as an optical transmission apparatus, a terminal device, or a network monitoring apparatus.

The processor 1202 reads out software (computer programs) from the memory 1203 and executes it, thereby executing the processes of the communication apparatus 1 and the like that have been described in the example embodiments described above by using the flowcharts. The processor 1202 may be a microprocessor, an MPU (Micro Processing Unit), or a CPU (Central Processing Unit), for example. The processor 1202 may include a plurality of processors.

The memory 1203 is composed of a combination of a volatile memory and a nonvolatile memory. The memory 1203 may include a storage remotely located from the processor 1202. In this case, the processor 1202 may access the memory 1203 via an I/O (Input/Output) interface (not illustrated in the drawings).

In the example of FIG. 11, the memory 1203 is used for storing a group of software modules. The processor 1202 reads out the group of software modules from the memory 1203 and executes it, thereby being capable of executing the processes of the communication apparatus 1 and the like, which have been described in the example embodiments described above.

As described with reference to FIG. 11, each of processors included in the communication apparatus 1 and the like executes one or a plurality of programs containing instruction groups for causing a computer to execute algorithm, which has been described with reference to the drawings.

In the examples described above, programs can be stored using various types of non-transitory computer readable mediums (non-transitory computer readable mediums), and can be supplied to the computer. The non-transitory computer readable mediums include various types of tangible storage mediums (tangible storage mediums). Examples of the non-transitory computer readable mediums include magnetic recording media (for example, floppy disks, magnetic tapes, and hard disk drives), magneto-optical recording media (for example, magneto-optical discs). Moreover, the examples of the non-transitory computer readable medium include CD-ROMs (Read Only Memories), CD-Rs, and CD-R/Ws. Moreover, the examples of the non-transitory computer readable medium include semiconductor memories. The semiconductor memories include mask ROMs, PROMs (Programmable ROMs), EPROMs (Erasable PROMs), and flash ROMs, RAMs (Random Access Memories), for example. Further, the programs may be supplied to the computer by various types of transitory computer readable mediums (transitory computer readable mediums). Examples of the transitory computer readable mediums include electrical signals, optical communication signals, and electromagnetic waves. The transitory computer readable mediums can supply programs to the computer via wired communication channels, such as electric wires and optical fibers, or wireless communication channels.

Note that the present disclosure is not limited to the example embodiments described above, and can be modified as appropriate without departing from the spirit and scope of the present disclosure. Further, the present disclosure may be implemented by appropriately combining the respective example embodiments.

Further, a part or all of the example embodiments described above can be described as Supplementary Notes described below, but are not limited to the followings.

(Supplementary Note 1)
A communication apparatus comprising:
acquisition means configured to acquire measured values of a predetermined number or more, the measured values being measured for communication quality information in an optical communication path;
estimation means configured to calculate an average value of the measured values thus acquired, generate a first cumulative distribution function of the communication quality information based on the measured values thus acquired, and estimate a second cumulative distribution function of the communication quality information based on measured values in a case where the measured values more than a number of the measured values thus acquired are acquired on a basis of the average value and the first cumulative distribution function; and
determination means configured to determine a value of the communication quality information as a reference quality value, a cumulative probability in the second cumulative distribution function becoming a predetermined value at the value of the communication quality information.

(Supplementary Note 2)
The communication apparatus according to Supplementary Note 1,
wherein the estimation means is further configured to calculate a slope in a region where a change in a cumulative probability in the first cumulative distribution function is steep, and approximate the second cumulative distribution function in a region where a change in the cumulative probability is steep by a straight line based on the average value and the slope, and
wherein the determination means is further configured to determine the reference quality value by using the straight line.

(Supplementary Note 3)
The communication apparatus according to Supplementary Note 2,
wherein the estimation means is further configured to calculate the slope and the average value after a first parameter is changed in a case where the first parameter is changed, the first parameter being a parameter in the optical communication path, dispersion of the values of the communication quality information depending upon a value of the first parameter, and
wherein the determination means is further configured to determine the reference quality value after the first parameter is changed on a basis of the average value and the slope after the first parameter is changed.

(Supplementary Note 4)
The communication apparatus according to Supplementary Note 3,
wherein the first parameter includes at least one of a modulation system used in the optical communication path or a guard band of a communication channel on the optical communication path.

(Supplementary Note 5)
The communication apparatus according to any one of Supplementary Notes 1 to 4,
wherein the estimation means is further configured to calculate, in a case where a second parameter is changed, a difference between the average value before the second parameter is changed and a first reference quality value indicating the reference quality value before the second parameter is changed as a margin value, and calculate a first average value indicating the average value after the second parameter is changed, the second parameter being a parameter in the optical communication path, dispersion of the values of the communication quality information being not depending upon a value of the second parameter, and wherein the determination means is further configured to determine reference quality value after the second parameter is changed on a basis of the first average value and the margin value.

(Supplementary Note 6)

The communication apparatus according to Supplementary Note 5, wherein the determination means is further configured to determine, as the reference quality value after the second parameter is changed, a value obtained by subtracting the margin value from the first average value.

(Supplementary Note 7)

The communication apparatus according to any one of Supplementary Note 1 to 6, wherein the estimation means is further configured to calculate, in a case where a second parameter is changed, a difference between a first average value indicating the average value after the second parameter is changed and a second average value indicating the average value before the second parameter is changed, the second parameter being a parameter in the optical communication path, dispersion of the values of the communication quality information being not depending upon a value of the second parameter, and wherein the determination means is further configured to determine the reference quality value after the second parameter is changed on a basis of a first reference quality value indicating the reference quality value before the second parameter is changed and the difference.

(Supplementary Note 8)

The communication apparatus according to Supplementary Note 7, wherein the determination means is further configured to:

determine, in a case where the first average value is larger than the second average value, a value obtained by adding the difference to the first reference quality value as the reference quality value after the second parameter is changed; and determine, in a case where the first average value is smaller than the second average value, a value obtained by subtracting the difference from the first reference quality value as the reference quality value after the second parameter is changed.

(Supplementary Note 9)

The communication apparatus according to any one of Supplementary Notes 5 to 8, wherein the second parameter includes at least one of optical transmission power or a number of communication channels in the optical communication path.

(Supplementary Note 10)

The communication apparatus according to any one of Supplementary Notes 3 to 9, further comprising:

control means configured to change the parameter so that the reference quality value after the parameter is changed satisfies a required quality value.

(Supplementary Note 11)

A communication control method comprising:

acquiring measured values of a predetermined number or more, the measured values being measured for communication quality information in an optical communication path;

calculating an average value of the measured values thus acquired, generating a first cumulative distribution function of the communication quality information based on the measured values thus acquired, and estimating a second cumulative distribution function of the communication quality information based on measured values in a case where the measured values more than a number of the measured values thus acquired are acquired on a basis of the average value and the first cumulative distribution function; and determining a value of the communication quality information as a reference quality value, a cumulative probability in the second cumulative distribution function becoming a predetermined value at the value of the communication quality information.

(Supplementary Note 12)

A non-transitory computer readable medium in which a program is stored, the program causing a computer to execute processes to:

acquire measured values of a predetermined number or more, the measured values being measured for communication quality information in an optical communication path;

calculate an average value of the measured values thus acquired, generate a first cumulative distribution function of the communication quality information based on the measured values thus acquired, and estimate a second cumulative distribution function of the communication quality information based on measured values in a case where the measured values more than a number of the measured values thus acquired are acquired on a basis of the average value and the first cumulative distribution function; and determine a value of the communication quality information as a reference quality value, a cumulative probability in the second cumulative distribution function becoming a predetermined value at the value of the communication quality information.

(Supplementary Note 13)

An optical communication system comprising:

a first communication apparatus; and a second communication apparatus connected to the first communication apparatus via an optical communication path, wherein the first communication apparatus is configured to:

acquire measured values of a predetermined number or more by measuring communication quality information in the optical communication path a predetermined number of times or more, and wherein the second communication apparatus is configured to:

calculate an average value of the measured values thus acquired, generate a first cumulative distribution function of the communication quality information based on the measured values thus acquired, and estimate a second cumulative distribution function of the communication quality information based on measured values in a case where the measured values more than a number of the measured values thus acquired are acquired on a basis of the average value and the first cumulative distribution function; and determine a value of the communication quality information as a reference quality value, a cumulative probability in the second cumulative distribution function becoming a predetermined value at the value of the communication quality information.

(Supplementary Note 14)

The optical communication system according to Supplementary Note 13, wherein the second communication apparatus is further configured to:

calculate a slope in a region where a change in a cumulative probability in the first cumulative distribution function is steep, and approximate the second cumulative distribution function in a region where a change in the cumulative probability is steep by a straight line based on the average value and the slope; and determine the reference quality value by using the straight line.

REFERENCE SIGNS LIST

1 COMMUNICATION APPARATUS
2, 22, 52 ACQUISITION UNIT
3 ESTIMATION UNIT
4 DETERMINATION UNIT
10, 40 TERMINAL DEVICE
20, 30, 60, 70 OPTICAL TRANSMISSION APPARATUS
21, 31, 51, 61, 71 COMMUNICATION UNIT
23, 53 CUMULATIVE DISTRIBUTION ESTIMATION UNIT
24, 54 COMMUNICATION QUALITY DETERMINATION UNIT
25, 55 CONTROL UNIT
26, 56 STORAGE UNIT
32 MEASUREMENT UNIT
50 NETWORK MONITORING APPARATUS
100, 200 OPTICAL COMMUNICATION SYSTEM
P1, P3 COMMUNICATION PATH
P2 OPTICAL COMMUNICATION PATH

What is claimed is:

1. A communication apparatus comprising:
   acquisition means configured to acquire measured values of a predetermined number or more, the measured values being measured for communication quality information in an optical communication path;
   estimation means configured to calculate an average value of the measured values thus acquired, generate a first cumulative distribution function of the communication quality information based on the measured values thus acquired, and estimate a second cumulative distribution function of the communication quality information based on measured values in a case where the measured values more than a number of the measured values thus acquired are acquired on a basis of the average value and the first cumulative distribution function; and
   determination means configured to determine a value of the communication quality information as a reference quality value, a cumulative probability in the second cumulative distribution function becoming a predetermined value at the value of the communication quality information.

2. The communication apparatus according to claim 1, wherein the estimation means is further configured to calculate a slope in a region where a change in a cumulative probability in the first cumulative distribution function is steep, and approximate the second cumulative distribution function in a region where a change in the cumulative probability is steep by a straight line based on the average value and the slope, and
   wherein the determination means is further configured to determine the reference quality value by using the straight line.

3. The communication apparatus according to claim 2, wherein the estimation means is further configured to calculate the slope and the average value after a first parameter is changed in a case where the first parameter is changed, the first parameter being a parameter in the optical communication path, dispersion of the values of the communication quality information depending upon a value of the first parameter, and
   wherein the determination means is further configured to determine the reference quality value after the first parameter is changed on a basis of the average value and the slope after the first parameter is changed.

4. The communication apparatus according to claim 3, wherein the first parameter includes at least one of a modulation system used in the optical communication path or a guard band of a communication channel on the optical communication path.

5. The communication apparatus according to claim 3, further comprising:
   control means configured to change the parameter so that the reference quality value after the parameter is changed satisfies a required quality value.

6. The communication apparatus according to claim 1, wherein the estimation means is further configured to calculate, in a case where a second parameter is changed, a difference between the average value before the second parameter is changed and a first reference quality value indicating the reference quality value before the second parameter is changed as a margin value, and calculate a first average value indicating the average value after the second parameter is changed, the second parameter being a parameter in the optical communication path, dispersion of the values of the communication quality information being not depending upon a value of the second parameter, and
   wherein the determination means is further configured to determine reference quality value after the second parameter is changed on a basis of the first average value and the margin value.

7. The communication apparatus according to claim 6, wherein the determination means is further configured to determine, as the reference quality value after the second parameter is changed, a value obtained by subtracting the margin value from the first average value.

8. The communication apparatus according to claim 6, wherein the second parameter includes at least one of optical transmission power or a number of communication channels in the optical communication path.

9. The communication apparatus according to claim 1, wherein the estimation means is further configured to calculate, in a case where a second parameter is changed, a difference between a first average value indicating the average value after the second parameter is changed and a second average value indicating the average value before the second parameter is changed, the second parameter being a parameter in the optical communication path, dispersion of the values of the communication quality information being not depending upon a value of the second parameter, and wherein the determination means is further configured to determine the reference quality value after the second parameter is changed on a basis of a first reference quality value indicating the reference quality value before the second parameter is changed and the difference.

10. The communication apparatus according to claim 9, wherein the determination means is further configured to:

determine, in a case where the first average value is larger than the second average value, a value obtained by adding the difference to the first reference quality value as the reference quality value after the second parameter is changed; and determine, in a case where the first average value is smaller than the second average value, a value obtained by subtracting the difference from the first reference quality value as the reference quality value after the second parameter is changed.

11. A communication control method comprising:

acquiring measured values of a predetermined number or more, the measured values being measured for communication quality information in an optical communication path;

calculating an average value of the measured values thus acquired, generating a first cumulative distribution function of the communication quality information based on the measured values thus acquired, and estimating a second cumulative distribution function of the communication quality information based on measured values in a case where the measured values more than a number of the measured values thus acquired are acquired on a basis of the average value and the first cumulative distribution function; and determining a value of the communication quality information as a reference quality value, a cumulative probability in the second cumulative distribution function becoming a predetermined value at the value of the communication quality information.

12. An optical communication system comprising:

a first communication apparatus; and a second communication apparatus connected to the first communication apparatus via an optical communication path, wherein the first communication apparatus is configured to:

acquire measured values of a predetermined number or more by measuring communication quality information in the optical communication path a predetermined number of times or more, and wherein the second communication apparatus is configured to:

calculate an average value of the measured values thus acquired, generate a first cumulative distribution function of the communication quality information based on the measured values thus acquired, and estimate a second cumulative distribution function of the communication quality information based on measured values in a case where the measured values more than a number of the measured values thus acquired are acquired on a basis of the average value and the first cumulative distribution function; and determine a value of the communication quality information as a reference quality value, a cumulative probability in the second cumulative distribution function becoming a predetermined value at the value of the communication quality information.

13. The optical communication system according to claim 12, wherein the second communication apparatus is further configured to:

calculate a slope in a region where a change in a cumulative probability in the first cumulative distribution function is steep, and approximate the second cumulative distribution function in a region where a change in the cumulative probability is steep by a straight line based on the average value and the slope; and determine the reference quality value by using the straight line.

* * * * *